(12) United States Patent
Hui et al.

(10) Patent No.: US 9,766,661 B2
(45) Date of Patent: Sep. 19, 2017

(54) STACKING DETACHABLE TABLET

(71) Applicant: Intel Corporation, Santa Clara, CA (US)

(72) Inventors: Michael Hui, Seattle, WA (US); Russell Aoki, Tacoma, WA (US); Anthony P. Valpiani, Graham, WA (US); Nicolas A. Kurczewski, Dupont, WA (US)

(73) Assignee: Intel Corporation, Santa Clara, CA (US)

( * ) Notice: Subject to any disclaimer, the term of this patent is extended or adjusted under 35 U.S.C. 154(b) by 339 days.

(21) Appl. No.: 14/126,242

(22) PCT Filed: Jul. 30, 2013

(86) PCT No.: PCT/US2013/052792
§ 371 (c)(1),
(2) Date: Dec. 13, 2013

(87) PCT Pub. No.: WO2015/016847
PCT Pub. Date: Feb. 5, 2015

(65) Prior Publication Data
US 2015/0036273 A1    Feb. 5, 2015

(51) Int. Cl.
*G06F 1/16*    (2006.01)

(52) U.S. Cl.
CPC ............ *G06F 1/1654* (2013.01); *G06F 1/166* (2013.01); *G06F 1/1643* (2013.01); *G06F 1/1683* (2013.01)

(58) Field of Classification Search
CPC .................. G06F 1/1654; G06F 1/66
USPC ..................................... 361/679.29
See application file for complete search history.

(56) References Cited

U.S. PATENT DOCUMENTS

| | | | |
|---|---|---|---|
| 5,333,116 A | 7/1994 | Hawkins et al. | |
| 5,805,415 A | 9/1998 | Tran et al. | |
| 6,006,243 A | 12/1999 | Karidis | |
| 6,404,622 B1 | 6/2002 | Chen | |
| 2010/0238620 A1* | 9/2010 | Fish | G06F 1/1616 361/679.09 |

FOREIGN PATENT DOCUMENTS

JP    2004-178540    6/2004

OTHER PUBLICATIONS

PCT International Search Report and Written Opinion received for PCT International Application No. PCT/US2013/052792, dated Apr. 24, 2014.
PCT International Preliminary Report on Patentability received for PCT International Application No. PCT/US2013/052792, dated Feb. 2, 2016.

* cited by examiner

*Primary Examiner* — Ramon M Barrera
(74) *Attorney, Agent, or Firm* — Patent Capital Group

(57) ABSTRACT

Particular embodiments described herein provide for an electronic device that could include a circuit board coupled to a plurality of electronic components (which includes any type of components, elements, circuitry, etc.). One particular example implementation of the electronic device may include a display portion and a keyboard portion that includes a cradle dock to allow the display portion to be removably connected to the keyboard portion in a first configuration, where a viewing angle of the display portion can be adjusted.

20 Claims, 22 Drawing Sheets

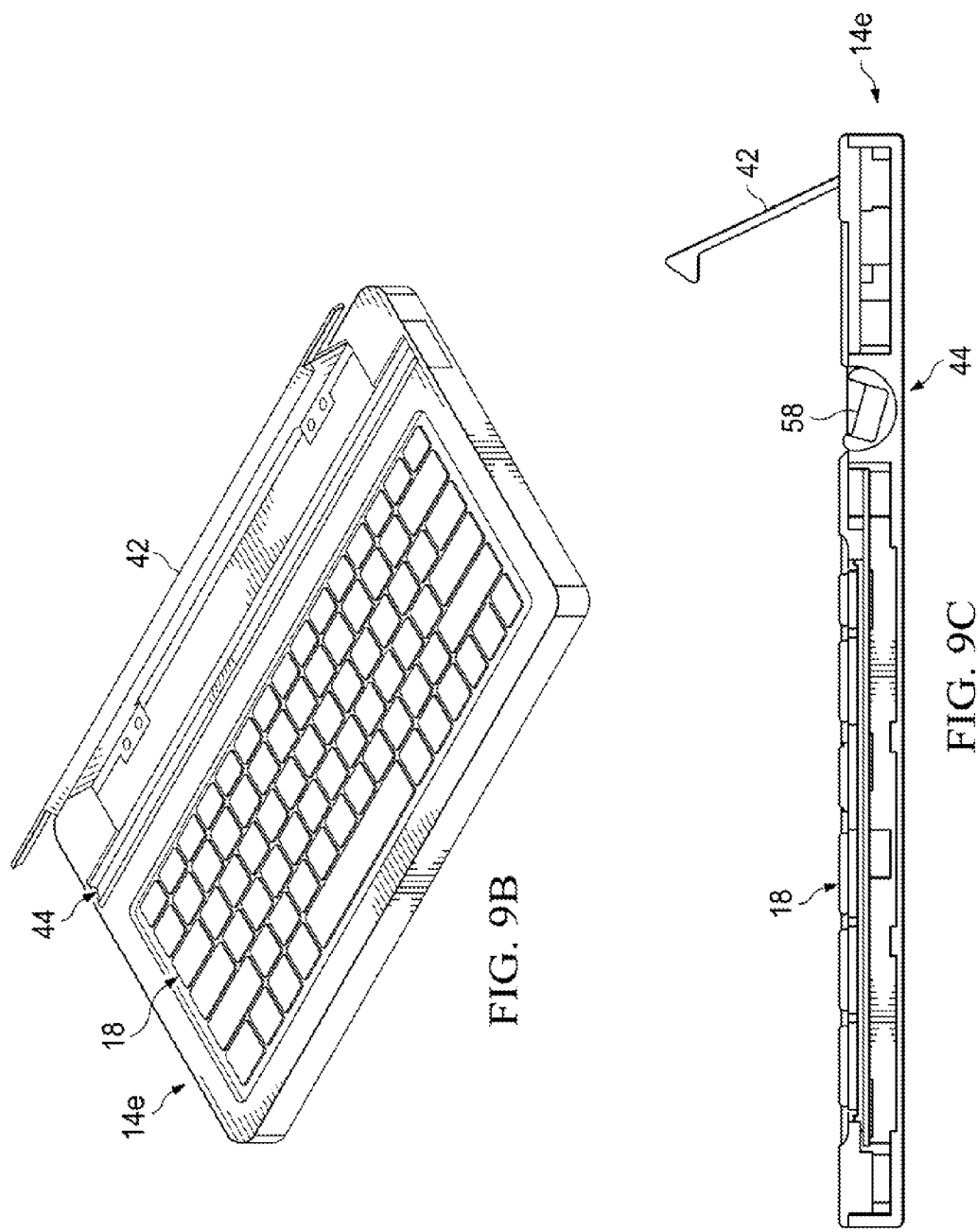

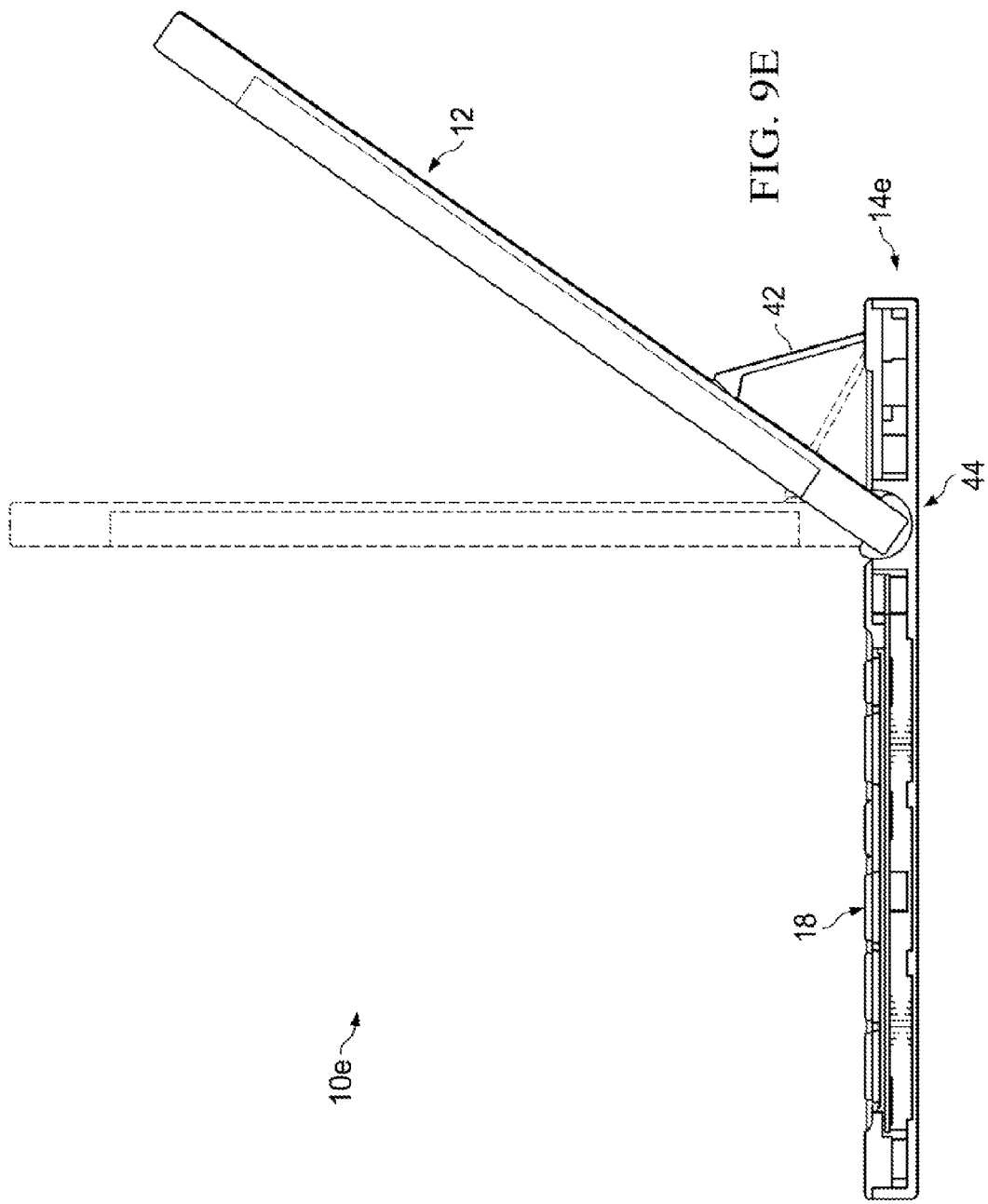

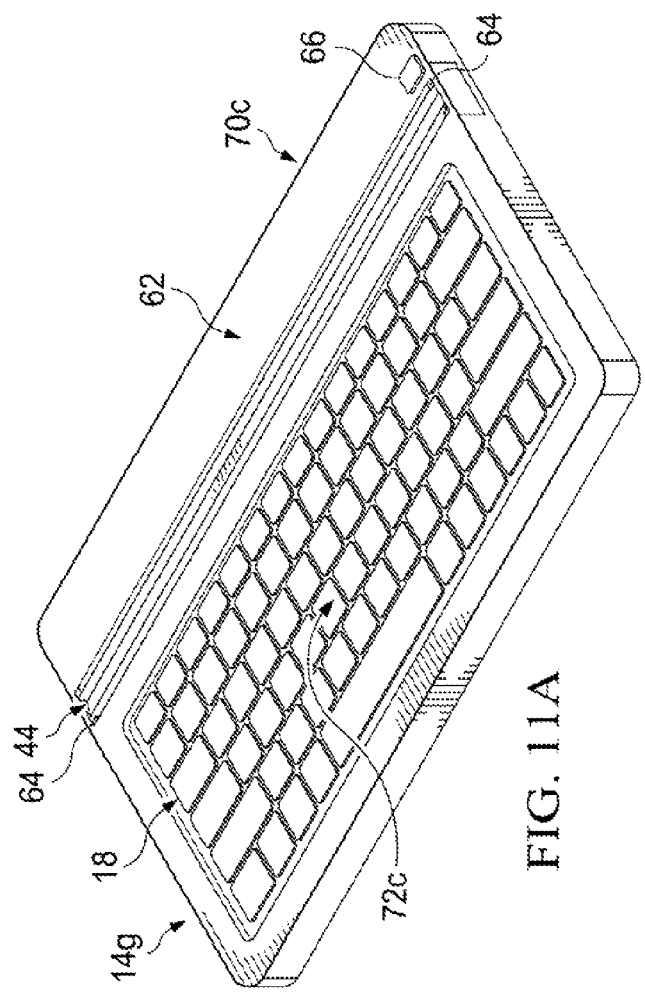
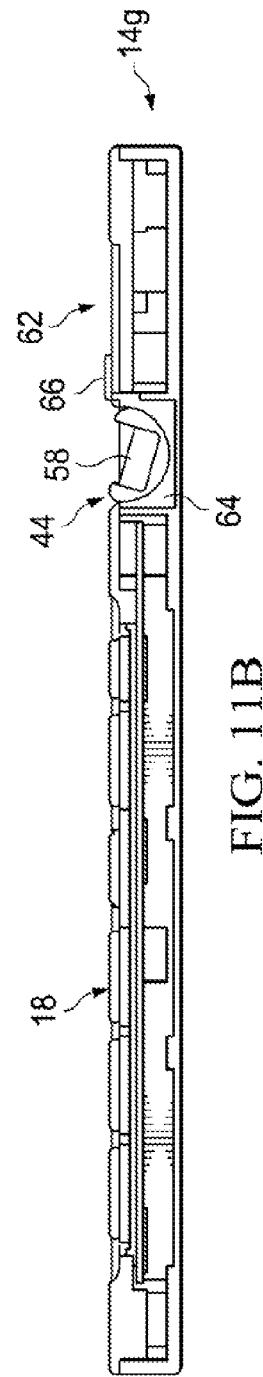
FIG. 11A
FIG. 11B

STACKING DETACHABLE TABLET

TECHNICAL FIELD

Embodiments described herein generally relate to detachable tablet mechanisms.

BRIEF DESCRIPTION OF THE DRAWINGS

Embodiments are illustrated by way of example and not by way of limitation in the FIGURES of the accompanying drawings, in which like references indicate similar elements and in which:

FIG. 9B is a simplified orthographic view illustrating an embodiment of an electronic device, in accordance with one embodiment of the present disclosure;

FIG. 9C is a simplified cut away side view illustrating an embodiment of an electronic device, in accordance with one embodiment of the present disclosure;

FIG. 9E is a simplified cut away side view illustrating an embodiment of an electronic device, in accordance with one embodiment of the present disclosure;

FIG. 11A is a simplified orthographic view illustrating an embodiment of an electronic device, in accordance with one embodiment of the present disclosure;

FIG. 11B is a simplified side cutaway view illustrating an embodiment of an electronic device, in accordance with one embodiment of the present disclosure;

The FIGURES of the drawings are not necessarily drawn to scale, as their dimensions can be varied considerably without departing from the scope of the present disclosure.

DETAILED DESCRIPTION OF EXAMPLE EMBODIMENTS

The following detailed description sets forth example embodiments of apparatuses, methods, and systems relating to keyboard protection configurations for an electronic device. Features such as structure(s), function(s), and/or characteristic(s), for example, are described with reference to one embodiment as a matter of convenience; various embodiments may be implemented with any suitable one or more of the described features.

Figure 1A:
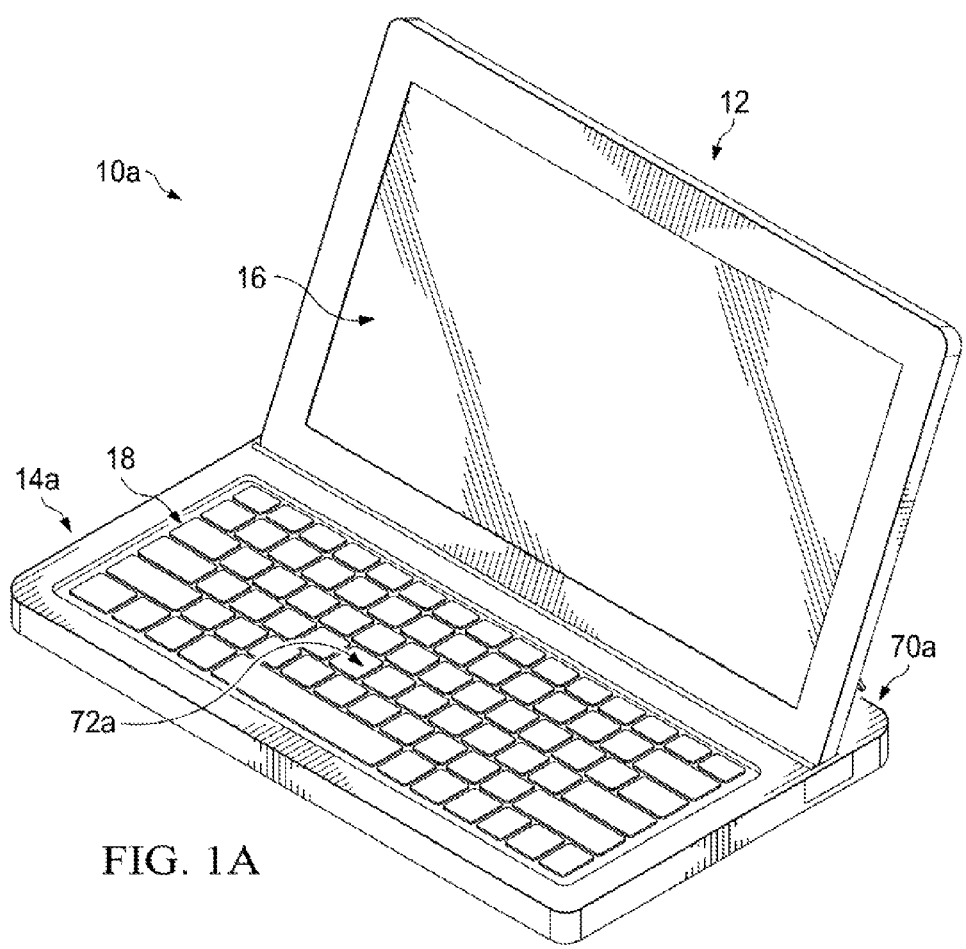
FIG. 1A is a simplified orthographic view illustrating an embodiment of an electronic device, in accordance with one embodiment of the present disclosure.

FIG. 1A is a simplified orthographic view illustrating an embodiment of an electronic device 10a in an open clamshell configuration in accordance with one embodiment of the present disclosure. Electronic device 10a may include a display portion 12 and a keyboard portion 14a. Display portion 12 may include a display 16. Keyboard portion 14a may include a keyboard 18. In an embodiment, display portion 12 and keyboard portion 14a can have about the same XY footprint (i.e., about the same length and about the same width). Display portion 12 can be removably connected to keyboard portion 14a in a first configuration (e.g., a clamshell configuration), where a viewing angle of the display portion can be adjusted. In addition, display portion 12 can be removably connected to keyboard portion 14a in a second configuration (e.g., a tablet configuration). In addition, when electronic device 10a is in the open clamshell configuration, display portion 12 may be located away from an edge 70 of keyboard portion 14a and towards a center portion 72 of keyboard portion 14a to allow the center of mass of electronic device 10a to be closer to center portion 72 and mitigate against tipping of electronic device 10a.

In one or more embodiments, electronic device 10a may be any suitable electronic device having a display such as a mobile device, a tablet computer and/or a tablet device (e.g., i-Pad), a personal digital assistant (PDA), a smartphone, an audio system, a movie player of any type, a computer docking station, etc. Display 16 may be a liquid crystal display (LCD), organic light-emitting diode (OLED), or some other type of display. Electronic device 10a can contain a battery and various electronics (e.g., wireless module (e.g., Wi-Fi module, Bluetooth module, etc.) processor, memory, camera, a microphone, speakers, etc.) to allow electronic device to operate.

Figure 1B:
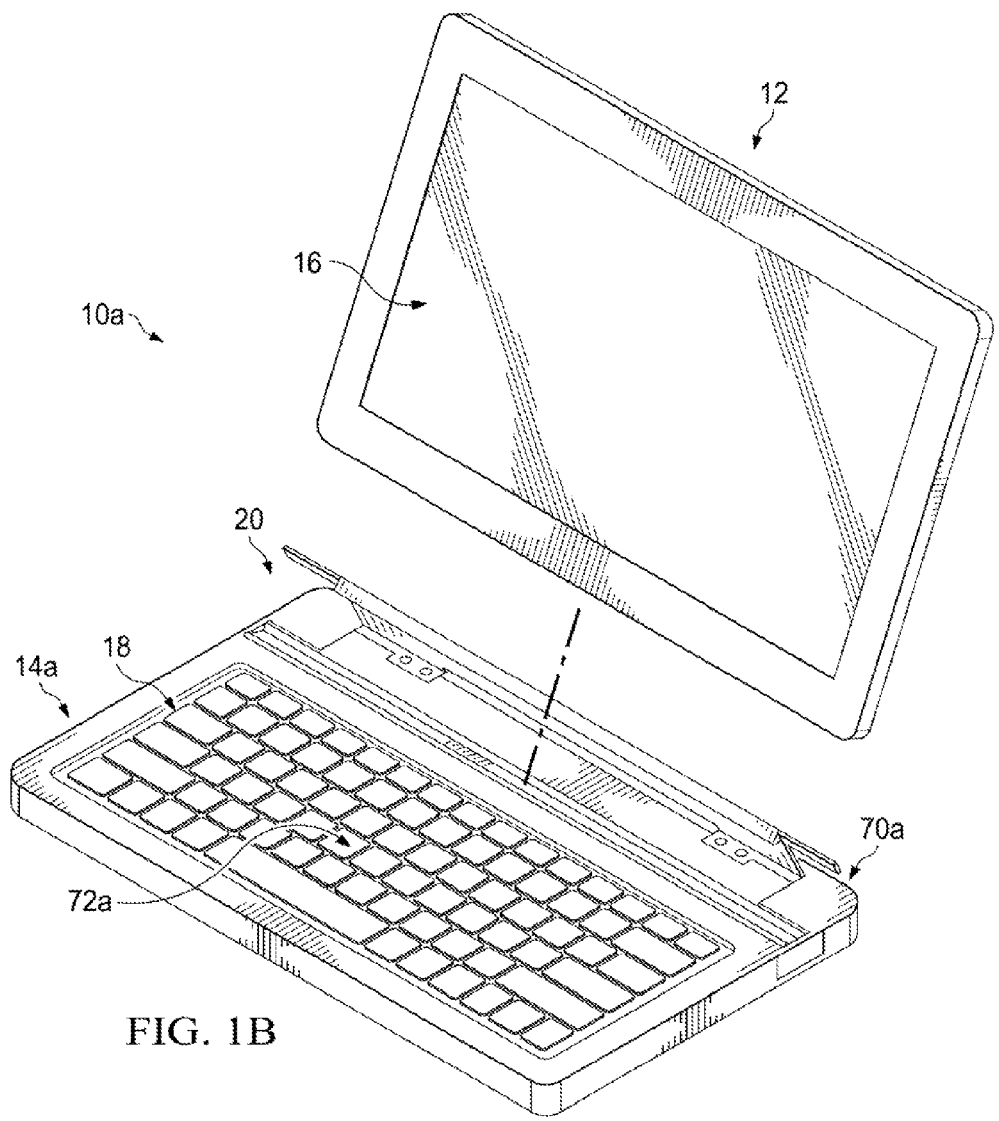
FIG. 1B is a simplified orthographic view illustrating an embodiment of an electronic device, in accordance with one embodiment of the present disclosure.

Turning to FIG. 1B, FIG. 1B is a simplified orthographic view illustrating electronic device 10a in a detached configuration, separated into two segments in accordance with one embodiment of the present disclosure. Display portion 12 and keyboard portion 14a may be connected by a cradle dock 20. Cradle dock 20 may be located away from edge 70 and towards center portion 72 so that when display portion 12 is connected to keyboard portion and electronic device 10a is in the open clamshell configuration, the center of mass of electronic device 10a is closer to center portion 72 and thus can mitigate tipping of electronic device 10a. Cradle dock 20 can define an axis of rotation (or multiple axes of rotation) that is shared between display portion 12 and keyboard portion 14a. Cradle dock 20 may include a printed circuit board (PCB) interconnector.

Using cradle dock 20, an electrical current and signals can be passed between display portion 12 and keyboard portion 14a to recharge an on-board battery or capacitor, power any number of items (e.g., display 16, a wireless module, a camera, speakers, etc.), and provide a communication path between display portion 12 and keyboard portion 14a. In other examples, electrical current and signals can be passed through a plug-in connector (e.g., whose male side protrusion connects to display portion 12 and whose female side connects to keyboard portion 14a or vice-verse) or a wireless connector (e.g., Wi-Fi, Bluetooth, etc.). Note that any number of connectors (e.g., Universal Serial Bus (USB) connectors (e.g., in compliance with the USB 3.0 Specification released in November 2008), Thunderbolt™ connectors, a non-standard connection point such as a docking connector, etc.) can be provisioned in conjunction with electronic device 10a. [Thunderbolt™ and the Thunderbolt logo are trademarks of Intel Corporation in the U.S. and/or other countries.]. Virtually any other electrical connection methods could be used and, thus, are clearly within the scope of the present disclosure.

Figure 1C:
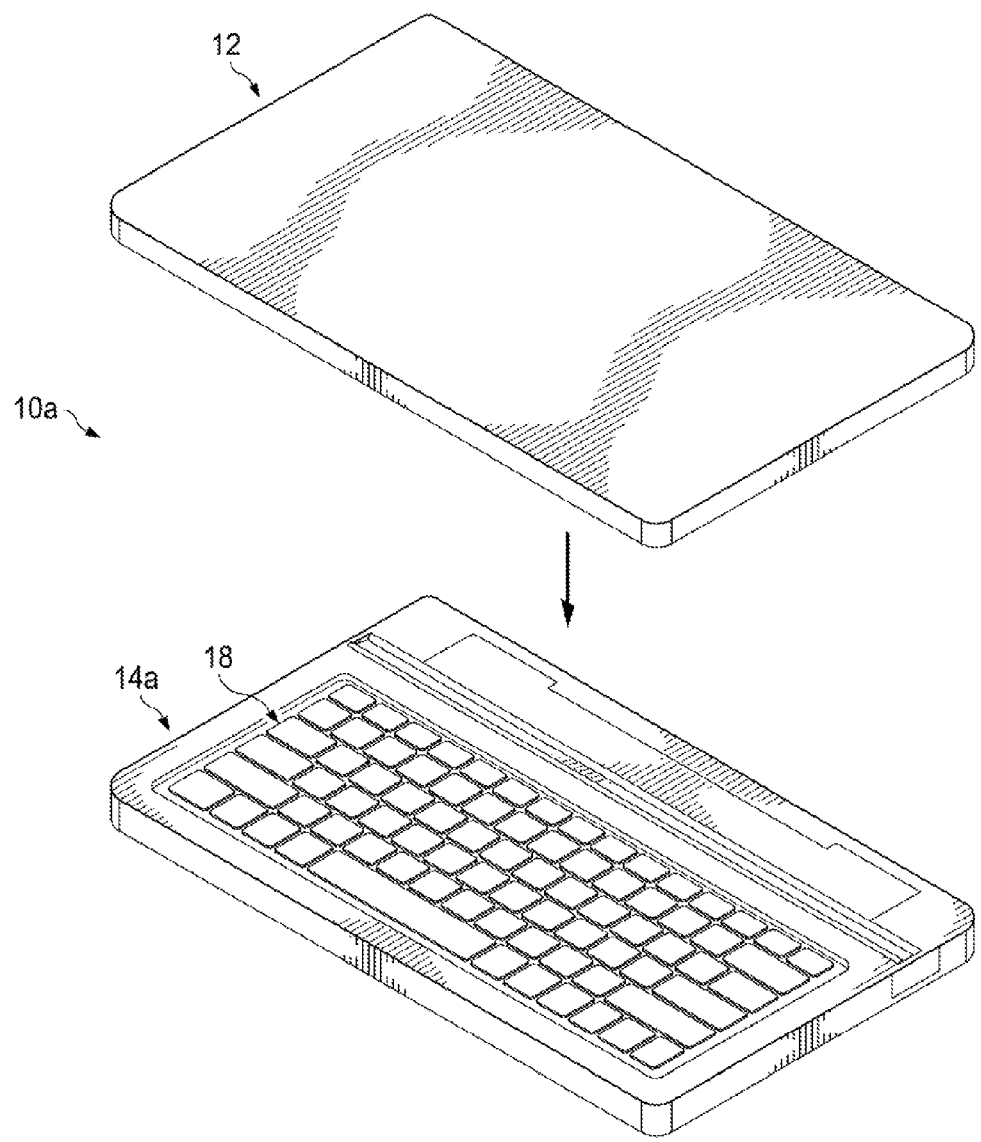
FIG. 1C is a simplified orthographic view illustrating an embodiment of an electronic device, in accordance with one embodiment of the present disclosure.
Figure 1D:
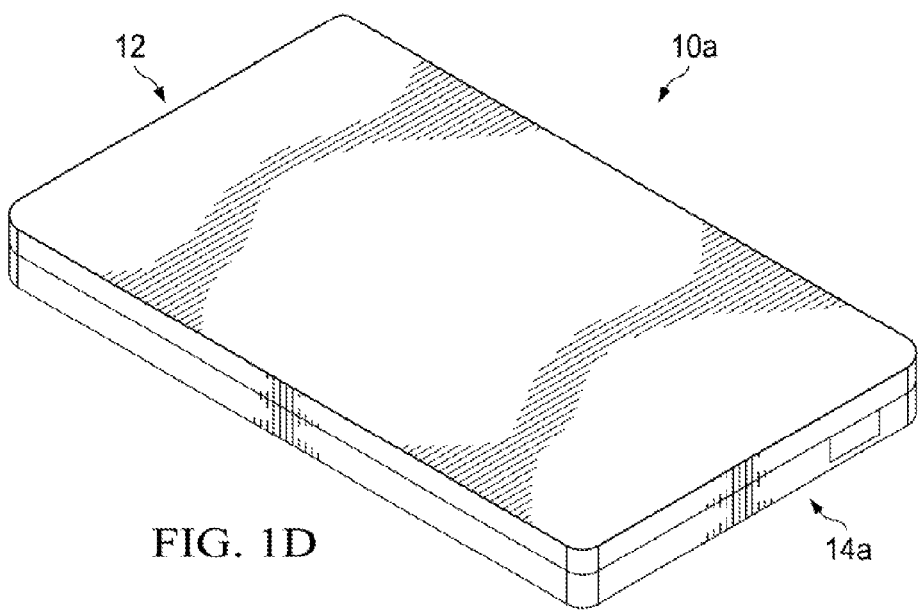
FIG. 1D is a simplified orthographic view illustrating an embodiment of an electronic device, in accordance with one embodiment of the present disclosure.

Turning to FIG. 1C, FIG. 1C is a simplified orthographic view illustrating display portion 12 being placed on keyboard portion 14a in accordance with one embodiment of the present disclosure. In FIG. 1C, display 16 (not shown) is facing keyboard 18. Turning to FIG. 1D, FIG. 1D is a simplified orthographic view illustrating an embodiment of an electronic device 10a in a closed clamshell configuration. As illustrated in FIG. 1D, the XY footprint (or size) of display portion 12 is the same (or about the same) as keyboard portion 14a such that a portion of display portion 12 (or a portion of keyboard portion 14a) does not extend (or slightly extends) past an edge of keyboard portion 14a (or of display portion 12).

Figure 1F:
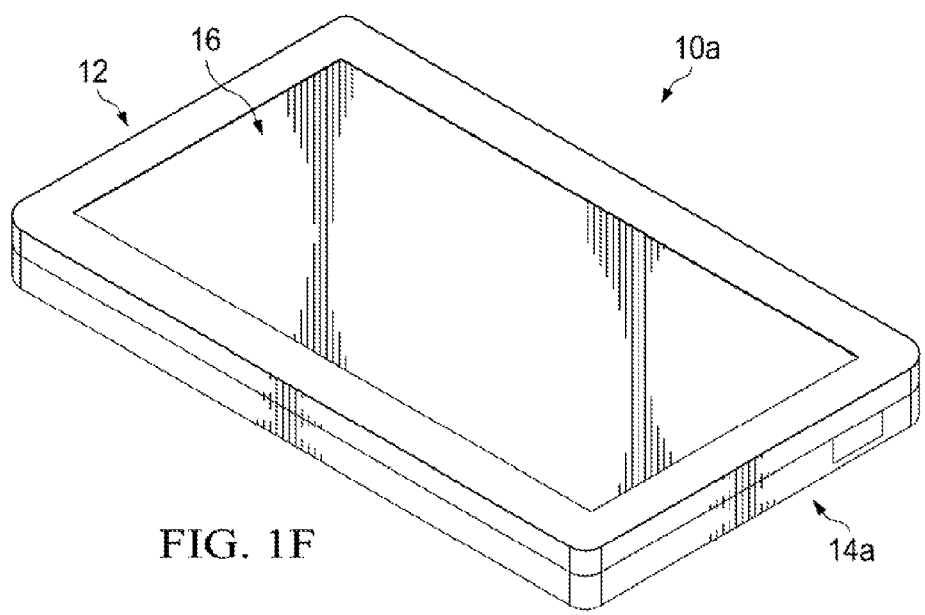
FIG. 1F is a simplified orthographic view illustrating an embodiment of an electronic device, in accordance with one embodiment of the present disclosure.
Figure 1E:
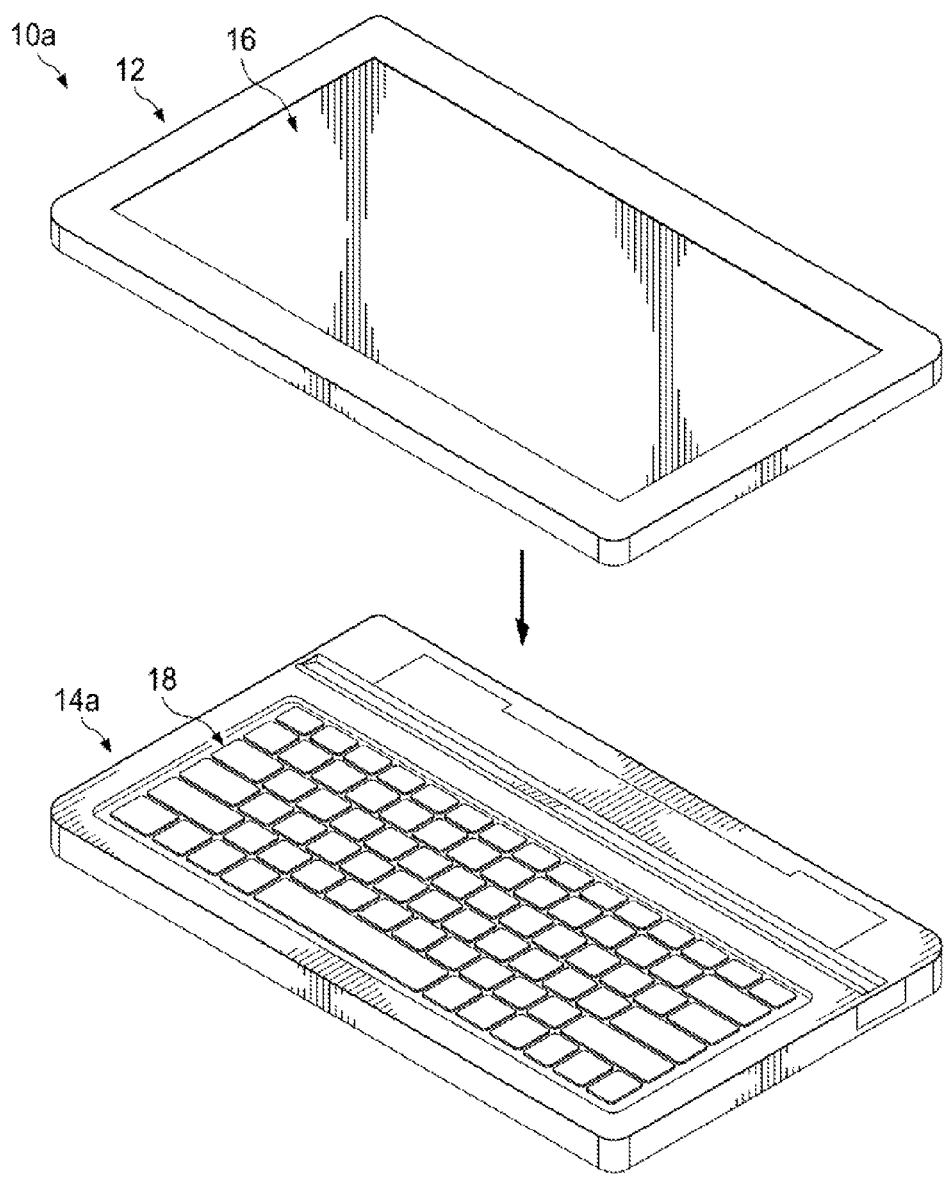
FIG. 1E is a simplified orthographic view illustrating an embodiment of an electronic device, in accordance with one embodiment of the present disclosure.

Turning to FIG. 1E, FIG. 1E is a simplified orthographic view illustrating display portion 12 being placed on keyboard portion 14a in accordance with one embodiment of the present disclosure. As illustrated in FIG. 1E, display 16 is facing away from keyboard 18. Turning to FIG. 1F, FIG. 1F is a simplified orthographic view illustrating an embodiment of an electronic device 10a in a tablet configuration. As illustrated in FIG. 1F, the XY footprint (or size) of display portion 12 is the same (or about the same) as keyboard portion 14a such that a portion of display portion 12 (or a portion of keyboard portion 14a) does not extend (or slightly extends) past an edge of keyboard portion 14a (or of display portion 12).

The following information may be viewed as a basis from which one or more embodiments may be explained. Although the embodiments described are related to laptops, tablets, convertible laptops, hybrid laptops, etc. there may be other embodiments that deal with phone, PDAs, audio systems, etc. A hybrid laptop, (e.g., a convertible computer, etc.) is a mobile computer that can include a clamshell or laptop configuration (illustrated in FIGS. 1A and 1D) and a tablet configuration (illustrated in FIG. 1F). To convert from the clamshell configuration to the tablet configuration, often the display or screen (e.g., display portion 12) can be separated from a base or a keyboard (e.g., keyboard portion 14a). While hybrid laptops are a compelling way of delivering convertibility from a clamshell configuration to a tablet configuration, in some designs, when the device is in an open clamshell configuration, the device is top heavy. This is because once detached, the display is a fully functioning tablet which necessitates that most of the electronics are in the display, leaving little system mass under the base. The fact that the device is top heavy makes the device susceptible to tip over while in an open clamshell configuration and many devices today are extremely unstable when using touchscreen functions, especially when using the device on an uneven surface such as a lap of a user. To remedy the problem of tipping, some devices have a larger base than the display. Unfortunately, this can make hybrid laptops undesirable to some users when the hybrid laptop is in a closed clamshell configuration as the base sticks out from an edge or edges of the display. Also, the detachable form factor can be confusing to the user because the tablet configuration can consist of two separate components and the user may be concerned about losing the base (which often includes a keyboard) or leaving the base at one location when the user is at another location.

In an embodiment, the electrical device can be configured to mitigate against tipping and allow for screen angle adjustment without compromising the XY footprint of the system or adding weight to the base of the electronic device. Electronic device can include two connection mechanisms between the display (e.g., display portion 12) and the base (e.g., keyboard portion 14*a*). The first connection mechanism may be a stacking connector such as magnets. The connector can allow for the display to be stacked on to and held against the base in either a tablet configuration (the display up) or a closed clamshell configuration (the display down). The configurations allow for the base to be stored behind the display when the electronic device is in a tablet configuration as well as a protected display configuration for transportation in a closed clamshell configuration. In an embodiment, a surface connector may allow for charging of the display from batteries in the base.

The second connection mechanism may be a cradle dock (e.g., cradle dock 20 or 'docking connector' more generally) that sits inward from a back edge (e.g., edge 70) of the base. The cradle dock may have only a back support plate (or back plate) for less total system thickness impact when compared to existing cradle docks used to achieve clamshell support. In an embodiment, the location of the cradle dock can create a "porch" or footing behind the display that stabilizes the system. The cradle dock may consist of pin inserts and a back plate to support the display in a clamshell configuration while allowing for viewing angle adjustment. When the display is undocked, the cradle dock can be receded (e.g., fully or at least substantially) into the base (i.e., the base has a flat or substantially flat profile) so that the display can be stacked or coupled to the base without interference (or with relatively little interference). The cradle dock's ability to recede may also protect connectors or interconnects from damage when the display and base are separated. A release mechanism may be activated to raise the cradle dock from a closed configuration and expose the connectors or interconnects for docking with the display. For example, when the display portion (or tablet) is lifted from the keyboard portion (or base), the cradle dock can be raised by pushing a simple button.

Note that any of the cradle docks discussed herein may be of any appropriate shape and dimensions, where its construction could reflect an integral piece (e.g., of plastic, metal, fiber, any combination of these, etc.) or its construction could reflect a number of components being fit together. The cradle dock could have various sub-parts (e.g., two sub-parts on either end of the keyboard portion or the display portion). The cradle dock could be hidden from sight, or exposed. In certain implementations, the cradle dock could extend the length of the keyboard portion or the display portion, or it could be much smaller. It is imperative to note that any such alternatives and permutations are clearly within the broad scope of the present disclosure.

Figure 2:
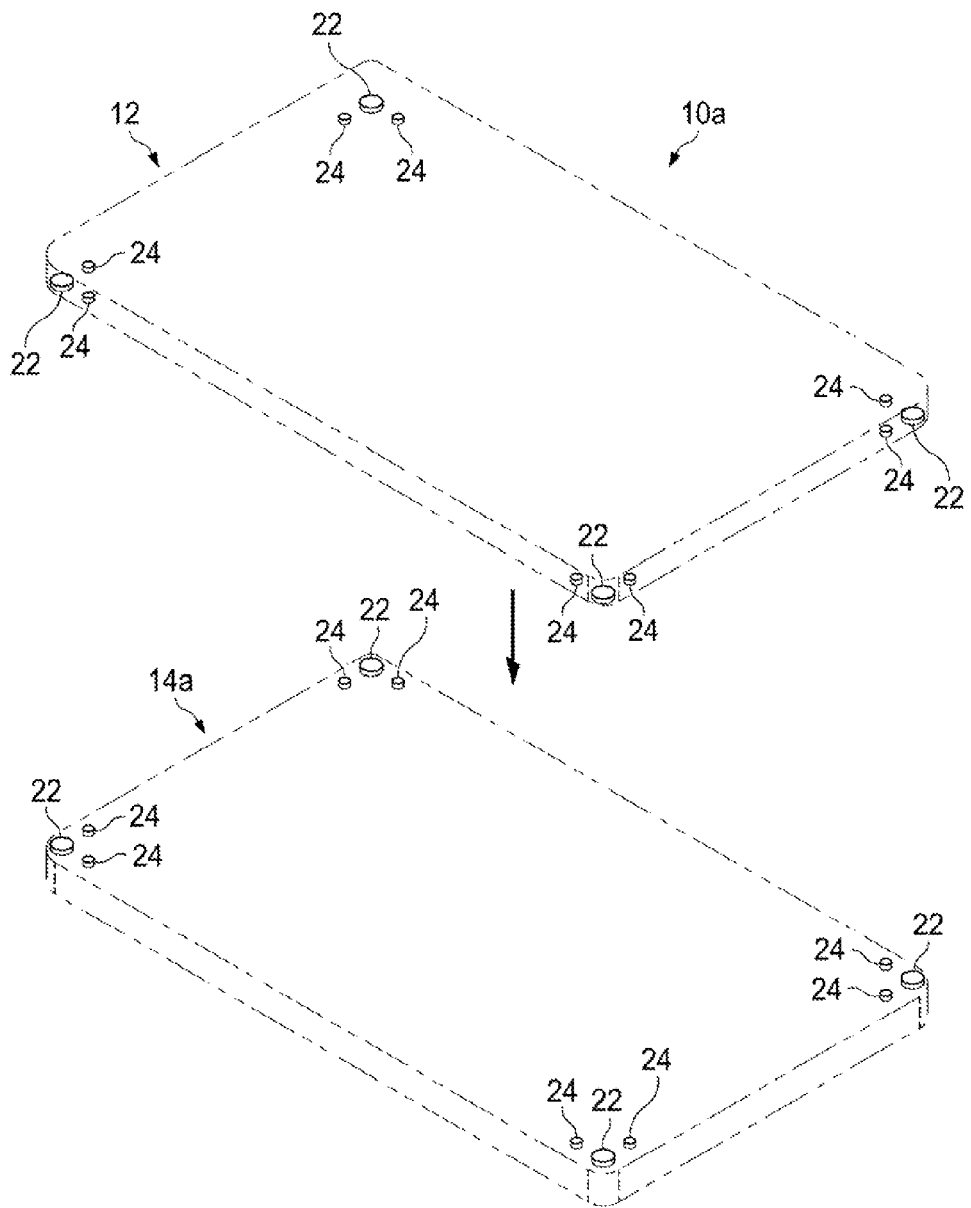
FIG. 2 is a simplified exploded orthographic view illustrating an embodiment of an electronic device, in accordance with one embodiment of the present disclosure.

Turning to FIG. 2, FIG. 2 is a simplified orthographic view illustrating electronic device 10*a* in accordance with one embodiment of the present disclosure. Electronic device 10*a* can include display portion 12 and keyboard portion 14*a*. Display portion 12 can include one or more stacking connectors 22 and one or more bumpers 24. Keyboard portion 14*a* may also include one or more stacking connectors 22 and one or more bumpers 24. In an embodiment, one or more stacking connectors 22 may be magnets. One or more stacking connectors 22 can facilitate connecting display portion 12 to keyboard portion 14*a* and keeping them connected together. One or more bumpers 24 may each be a rubber bumper to mitigate against scuffing from display portion 12 and keyboard portion 14*a* and to absorb any shock that may occur when display portion 12 and keyboard portion 14*a* are connected together.

In an embodiment, the attractive force between one or more stacking connectors 22 on display portion 12 and one or more stacking connectors 22 on keyboard portion 14*a* can be such that a relatively small amount of force is required to remove display portion 12 from keyboard portion 14*a* (e.g., a user can remove display portion 12 from keyboard portion 14*a* with one hand). One or more of stacking connectors 22 may be encased in electronic device 10*a* and provide a directional focus for the magnetic field created by one or more stacking connectors 22. In addition, one or more stacking connectors 22 may be accompanied by a suitable backing (e.g., a steel backing) to reduce unwanted stray magnetic fields. In a particular example implementation, rare earth magnets with alternating polarity and a steel back plate can be used to reduce stray magnetic fields and to concentrate the magnetic fields in a desired direction.

Figure 3A:
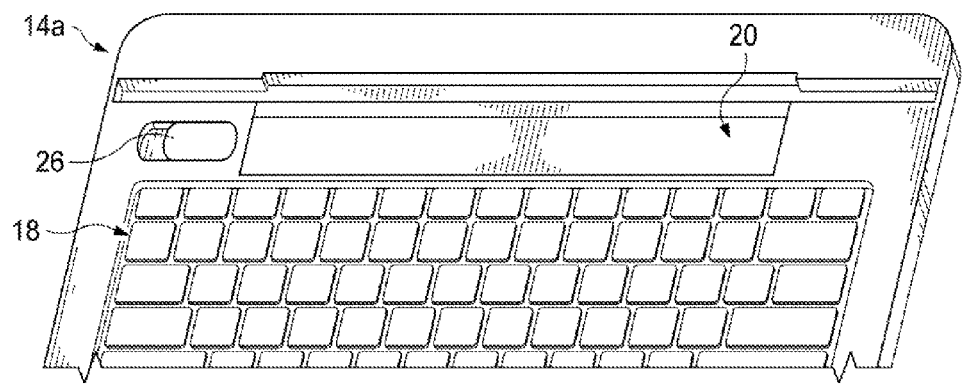
FIG. 3A is a simplified orthographic view illustrating an embodiment of an electronic device, in accordance with one embodiment of the present disclosure.

Turning to FIG. 3A, FIG. 3A is a simplified orthographic view illustrating a portion of electronic device 10*a* in accordance with one embodiment of the present disclosure. Electronic device 10*a* includes cradle dock 20 and release mechanism 26. As illustrated in FIG. 3A, cradle dock 20 is in a closed or stored position where cradle dock 20 has a substantially flat profile with keyboard portion 14*a*. Release mechanism 26 is illustrated as a slider, however, release mechanism may be any release mechanism (mechanical or electrical) that can be activated to raise or release cradle dock 20 from a closed configuration. A magnet or some other retention device may be used to secure cradle dock 20 in the closed or stored position.

Figure 3B:
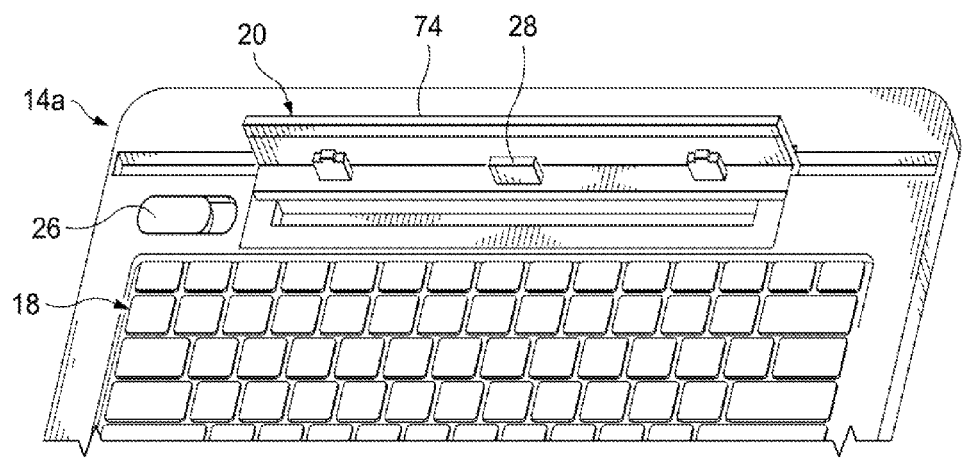
FIG. 3B is a simplified orthographic view illustrating an embodiment of an electronic device, in accordance with one embodiment of the present disclosure.

Turning to FIG. 3B, FIG. 3B is a simplified orthographic view illustrating a portion of electronic device 10*a* in accordance with one embodiment of the present disclosure. Cradle dock 20 can include one or more connection 28 and a back plate 74. As illustrated in FIG. 3B, release mechanism 26 has been activated. The activation of release mechanism 26 causes cradle dock 20 to raise up or rotate such that one or more connections 28 are exposed. One or more connections 28 may be a PCB connection or interconnector, optical connection, or a wireless connection. The activation of release mechanism 26 may cause a retention mechanism (e.g., a magnet) holding cradle dock 20 to become disengaged. A spring may be used to help cradle dock 20 to raise up or rotate.

Figure 3C:
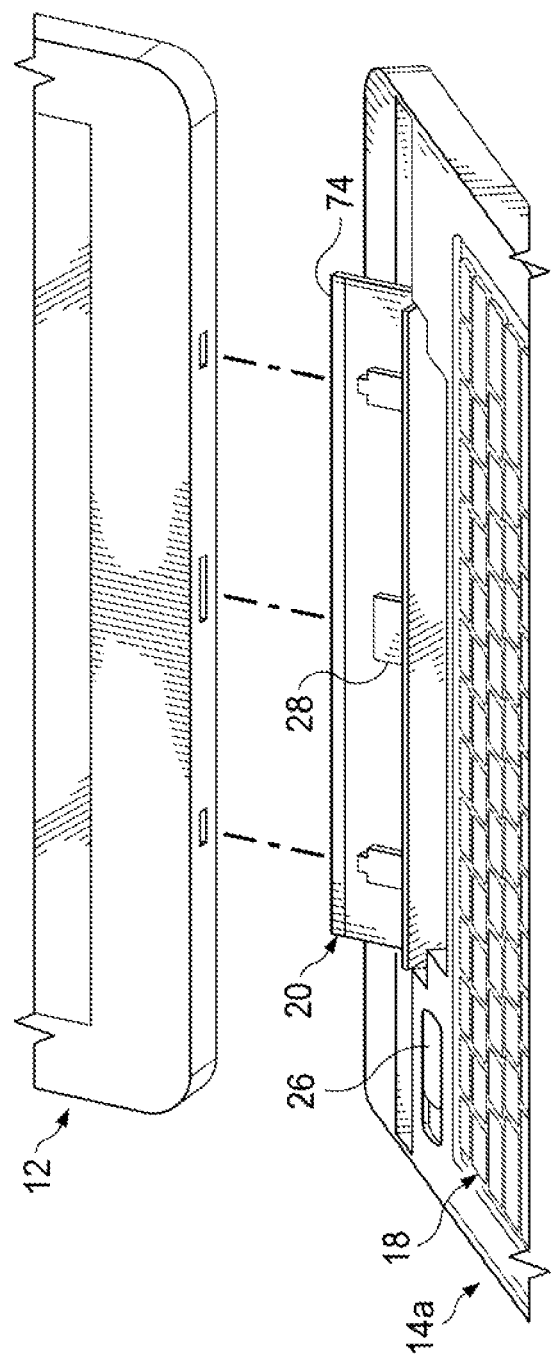
FIG. 3C is a simplified orthographic view illustrating an embodiment of an electronic device, in accordance with one embodiment of the present disclosure.

Turning to FIG. 3C, FIG. 3C is a simplified orthographic view illustrating a portion of electronic device 10*a* in accordance with one embodiment of the present disclosure. Display portion 12 can be connected to cradle dock 20 to allow an electrical current and signals to pass from display portion 12 to keyboard portion 14*a*. Display portion 12 can be supported by back plate 74.

Figure 4B:
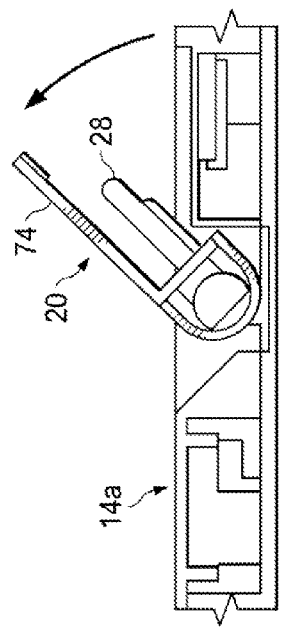
FIG. 4B is a simplified cut away side view illustrating an embodiment of an electronic device, in accordance with one embodiment of the present disclosure.
Figure 4D:
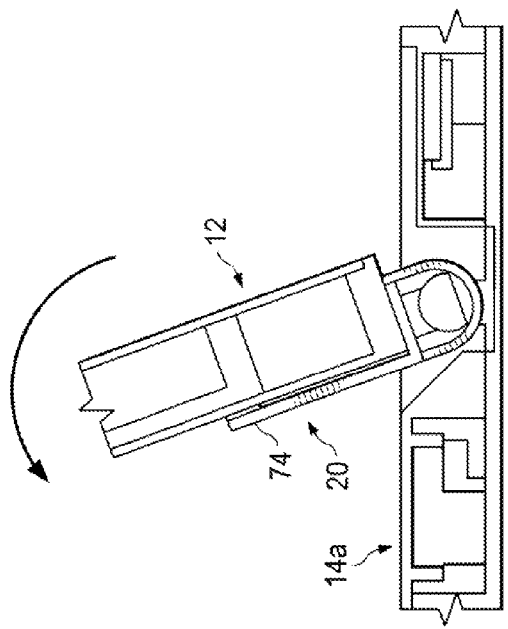
FIG. 4D is a simplified cut away side view illustrating an embodiment of an electronic device, in accordance with one embodiment of the present disclosure.
Figure 4A:
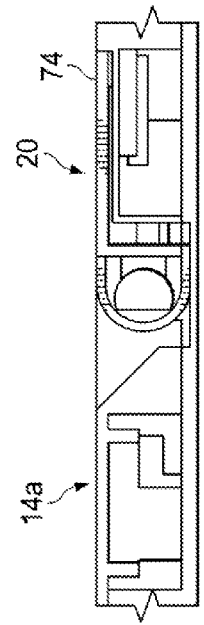
FIG. 4A is a simplified cut away side view illustrating an embodiment of an electronic device, in accordance with one embodiment of the present disclosure.

Turning to FIG. 4A, FIG. 4A is a simplified cut away side view illustrating an embodiment of a portion of electronic device 10*a* in accordance with one embodiment of the present disclosure. When cradle dock 20 is in a closed or stored configuration, cradle dock 20 has a relatively flat profile with keyboard portion 14*a*. For example, back plate 74 may be flush or even with the top surface of keyboard portion 14*a*.

Turning to FIG. 4B, FIG. 4B is a simplified cut away side view illustrating an embodiment of a portion of electronic device 10*a* in accordance with one embodiment of the present disclosure. As illustrated in FIG. 4B, release mechanism 26 (not shown) has been activated. The activation of release mechanism 26 causes cradle dock 20 to raise up or rotate such that one or more connections 28 are exposed. A spring may be used to help cradle dock 20 to raise up or rotate.

Figure 4C:
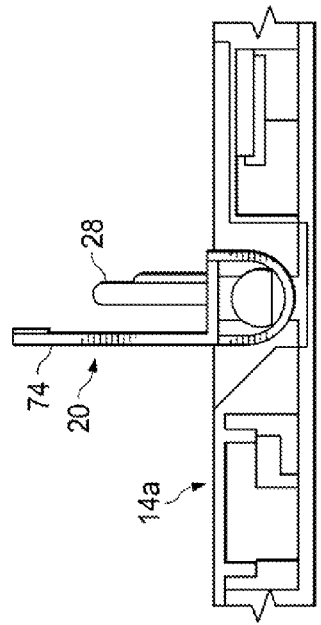
FIG. 4C is a simplified cut away side view illustrating an embodiment of an electronic device, in accordance with one embodiment of the present disclosure.

Turning to FIG. 4C, FIG. 4C is a simplified cut away side view illustrating an embodiment a portion of electronic device 10a in accordance with one embodiment of the present disclosure. The activation of release mechanism 26 causes cradle dock 20 to raise up (e.g., up to about ninety degrees (90°) relative to keyboard portion 14a) or rotate such that one or more connections 28 are exposed. This can allow for display portion 12 to be docked or connected to keyboard portion 14a.

Turning to FIG. 4D, FIG. 4D is a simplified cut away side view illustrating an embodiment of a portion of electronic device 10a in accordance with one embodiment of the present disclosure. As illustrated in FIG. 4D, display portion 12 has been docked or connected to keyboard portion 14a using cradle dock 20. Display portion 12 may be rotated on cradle dock 20 to allow for a desired display angle. In an embodiment, when cradle dock 20 is in a closed position through an upright position (as illustrate in FIGS. 4A-4C) the rotation of cradle dock 20 has a low or almost zero torque range to allow for easy rising of cradle dock 20. When display portion 12 is connected to cradle dock 20 and cradle dock 20 is rotated past the upright position (as illustrated in FIG. 4D) the rotation of cradle dock 20 may have a relatively high torque resistance to support and keep display portion 12 at a desired display angle.

Figure 5A:
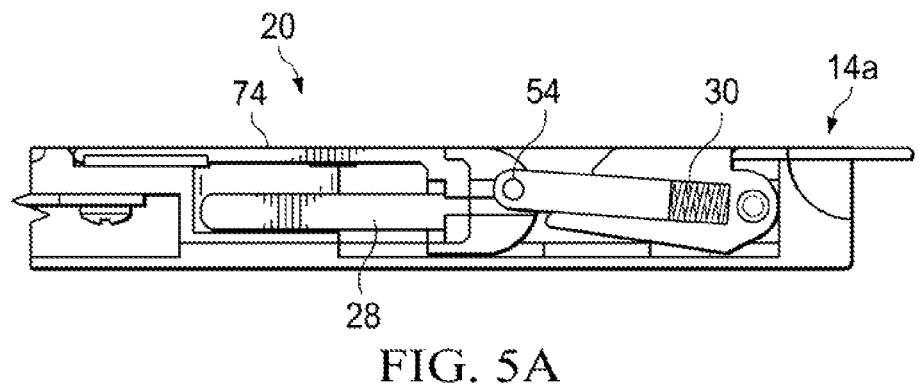
FIG. 5A is a simplified cut away side view illustrating an embodiment of an electronic device, in accordance with one embodiment of the present disclosure.

Turning to FIG. 5A, FIG. 5A is a simplified cut away side view illustrating an embodiment of a portion of electronic device 10a in accordance with one embodiment of the present disclosure. Cradle dock 20 can include one or more connections 28, a compression spring 30, a pivot point 54, and back plate 74. Back plate 74 may be flush or even with the top surface of keyboard portion 14a and held in place by compression spring 30 being over-centered on cradle dock 20.

Figure 5B:
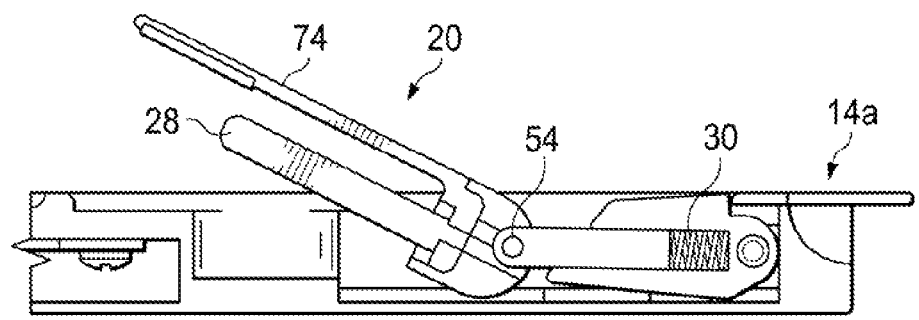
FIG. 5B is a simplified cut away side view illustrating an embodiment of an electronic device, in accordance with one embodiment of the present disclosure.

Turning to FIG. 5B, FIG. 5B is a simplified cut away side view illustrating an embodiment of a portion of electronic device 10a in accordance with one embodiment of the present disclosure. As illustrated in FIG. 5B, cradle dock 20 has been raised. A user may manually raise cradle dock 20 or a release mechanism may cause cradle dock 20 to rise up or rotate about pivot point 54 such that one or more connections 28 are exposed. Compression spring 30 can push against cradle dock 20 and cause cradle dock 20 to move about pivot point 54 and help cradle dock 20 to raise or rotate.

Figure 5C:
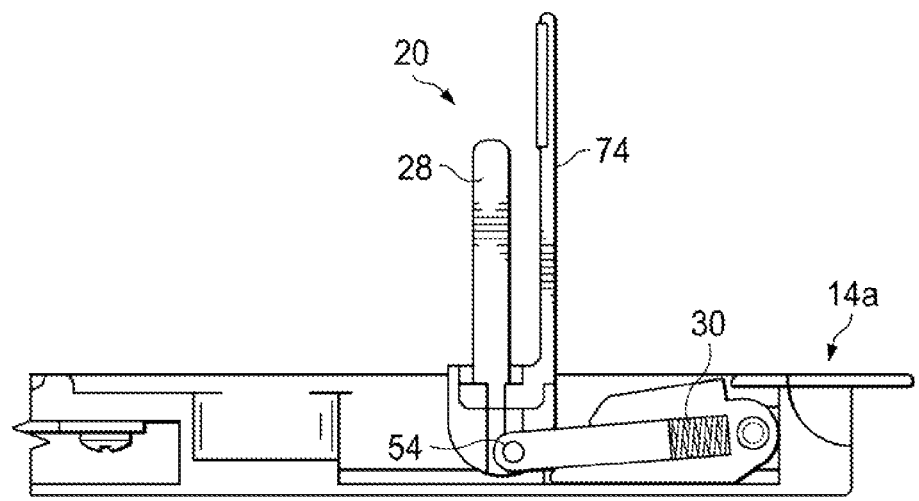
FIG. 5C is a simplified cut away side view illustrating an embodiment of an electronic device, in accordance with one embodiment of the present disclosure.
Figure 5D:
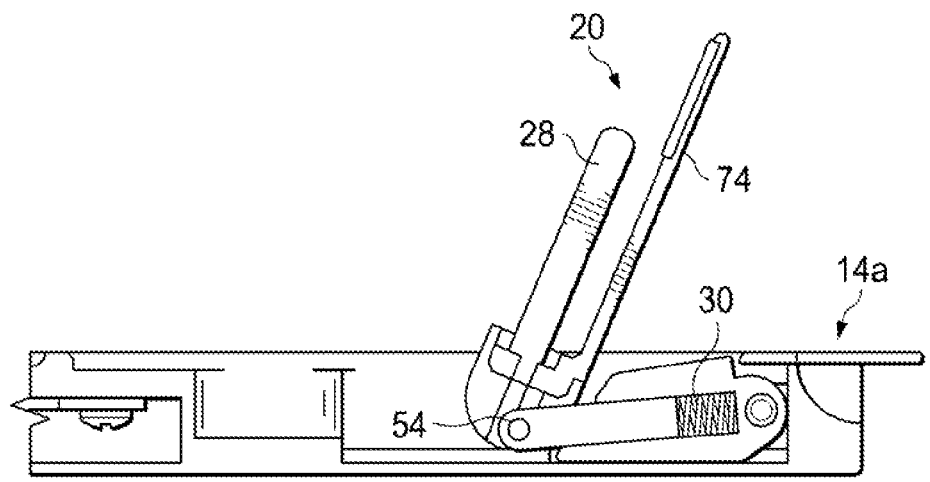
FIG. 5D is a simplified cut away side view illustrating an embodiment of an electronic device, in accordance with one embodiment of the present disclosure.

Turning to FIG. 5C, FIG. 5C is a simplified cut away side view illustrating an embodiment of a portion of electronic device 10a in accordance with one embodiment of the present disclosure. As illustrated in FIG. 5C, cradle dock 20 is in an upright position that can allow for display portion 12 to be docked with keyboard portion 14a. Turning to FIG. 5D, FIG. 5D is a simplified cut away side view illustrating an embodiment of a portion of electronic device 10a in accordance with one embodiment of the present disclosure. When connected, display portion 12 (not shown) may be rotated on cradle dock 20 to allow for a desired display angle. In an embodiment, when cradle dock 20 is in a closed through upright position (as illustrate in FIGS. 5A-5C) the rotation of cradle dock 20 has a low or almost zero torque range to allow for easy rising of cradle dock 20. In an embodiment, the upright position may be equal to or less than about 90°. When display portion 12 is connected to cradle dock 20 and cradle dock 20 is rotated past the upright position (as illustrated in FIG. 5D) the rotation of cradle dock 20 may have a relatively high torque resistance to support and keep display portion 12 at a desired display angle. In an embodiment, past about 90°, the torque resistance may be large enough to support display portion 12. More specifically, the torque may be greater than about eight (8) kilograms of force per centimeter. This can allow cradle dock 20 to support a 1.75 pound display portion 12 and allow for about one hundred and sixty (160) grams of applied touch force when a user is interacting with a touch display.

Figure 5E:
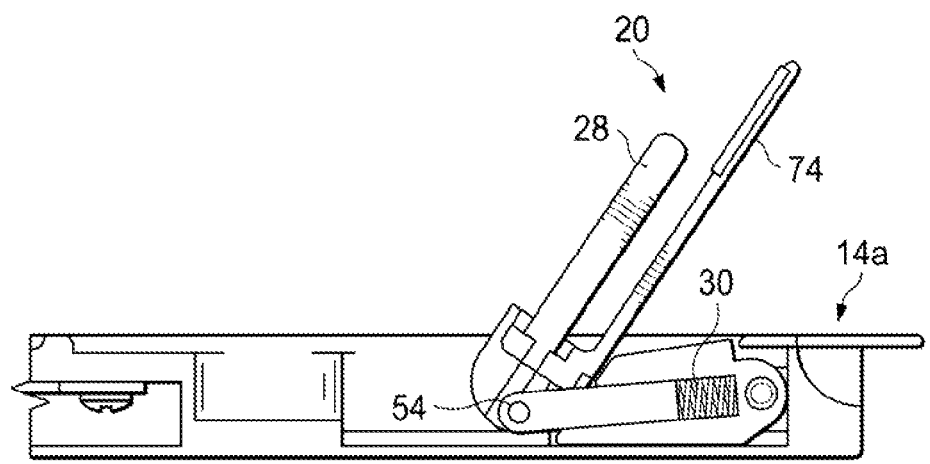
FIG. 5E is a simplified cut away side view illustrating an embodiment of an electronic device, in accordance with one embodiment of the present disclosure.

Turning to FIG. 5E, FIG. 5E is a simplified cut away side view illustrating an embodiment of a portion of electronic device 10a in accordance with one embodiment of the present disclosure. In an embodiment, at an angle of about one hundred and thirty-five degrees (135°), cradle dock 20 may reach a maximum degree of rotation. Cradle dock 20 may rest against keyboard portion 14a to prevent over rotation.

Figure 6A:
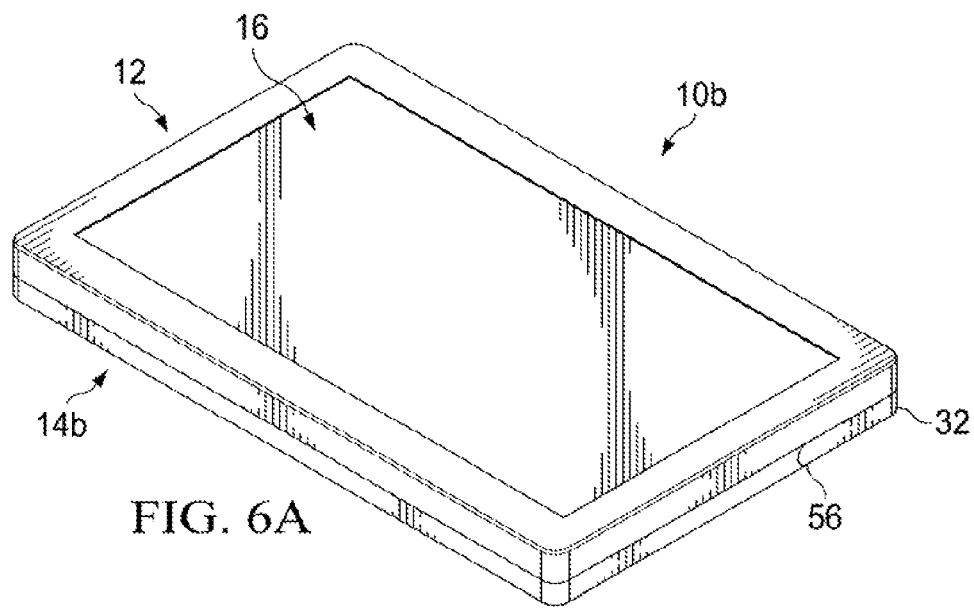
FIG. 6A is a simplified orthographic view illustrating an embodiment of an electronic device, in accordance with one embodiment of the present disclosure.

Turning to FIG. 6A, FIG. 6A is a simplified orthographic view illustrating an electronic device 10b in accordance with one embodiment of the present disclosure. Electronic device 10b includes display portion 12, a keyboard portion 14b, display 16, and a folding support 32. When electronic device 10b is in a tablet configuration, (as illustrated in FIG. 6A), folding support 32 is in a closed position and keyboard portion 14b has a relatively flat profile. Folding support may rotate about folding support hinge 56.

Figure 6B:
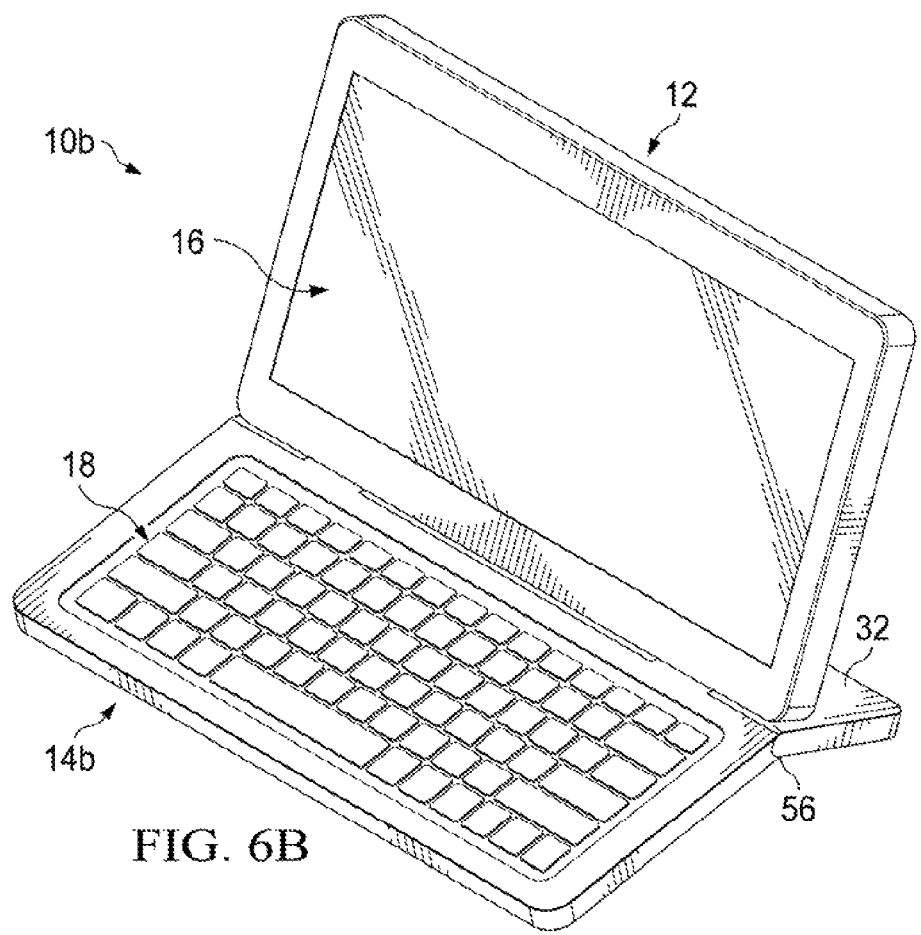
FIG. 6B is a simplified orthographic view illustrating an embodiment of an electronic device, in accordance with one embodiment of the present disclosure.

Turning to FIG. 6B, FIG. 6B is a simplified orthographic view illustrating electronic device 10b in accordance with one embodiment of the present disclosure. When electronic device is in an open tablet configuration, display portion 12 can be connected to keyboard portion 12 through cradle dock 20 (not shown). Folding support 32 can be rotated about folding support hinge 56 to help provide support for electronic device 10. In an embodiment, folding support 32 includes cradle dock 20 (not shown).

Figure 7A:
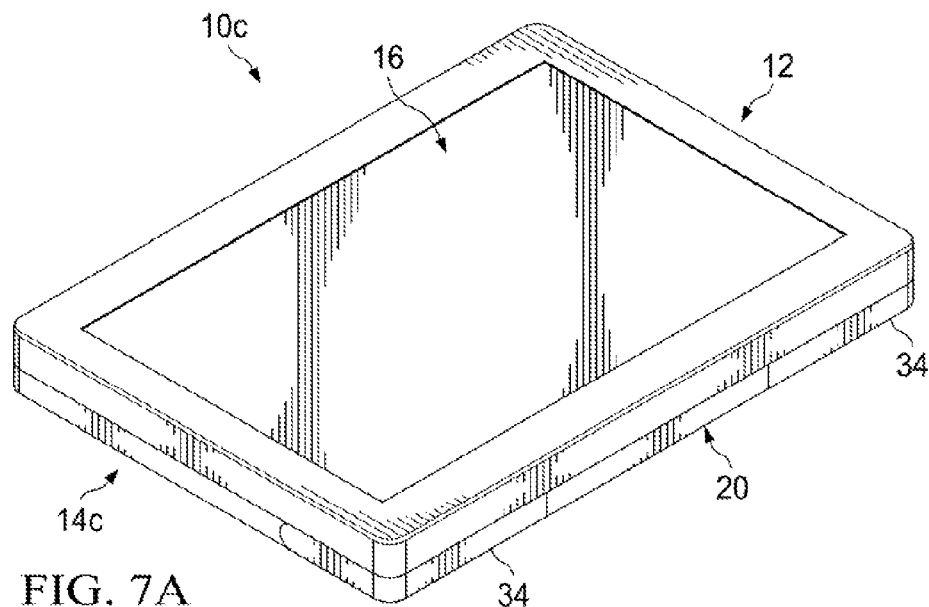
FIG. 7A is a simplified orthographic view illustrating an embodiment of an electronic device, in accordance with one embodiment of the present disclosure.

Turning to FIG. 7A, FIG. 7A is a simplified orthographic view illustrating an electronic device 10c in accordance with one embodiment of the present disclosure. Electronic device 10c includes display portion 12, a keyboard portion 14c, display 16, cradle dock 20, and side folding supports 34. When electronic device 10c is in a tablet configuration, (as illustrated in FIG. 7A), side folding supports 34 are in a closed position and keyboard portion 14c has a relatively flat profile.

Figure 7B:
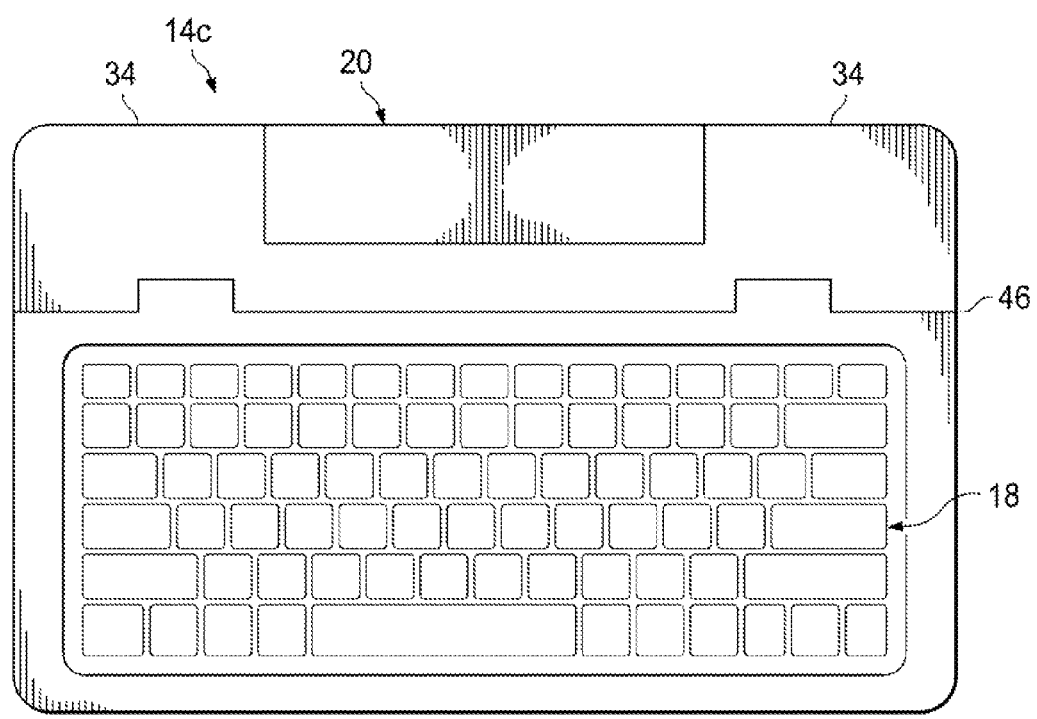
FIG. 7B is a simplified orthographic view illustrating an embodiment of an electronic device, in accordance with one embodiment of the present disclosure.

Turning to FIG. 7B, FIG. 7B is a simplified orthographic view illustrating keyboard portion 14c in accordance with one embodiment of the present disclosure. Keyboard portion 14c includes keyboard 18, cradle dock 20, side folding supports 34, and a hinge 46. Side folding supports can rotate about hinge 46.

Figure 7C:
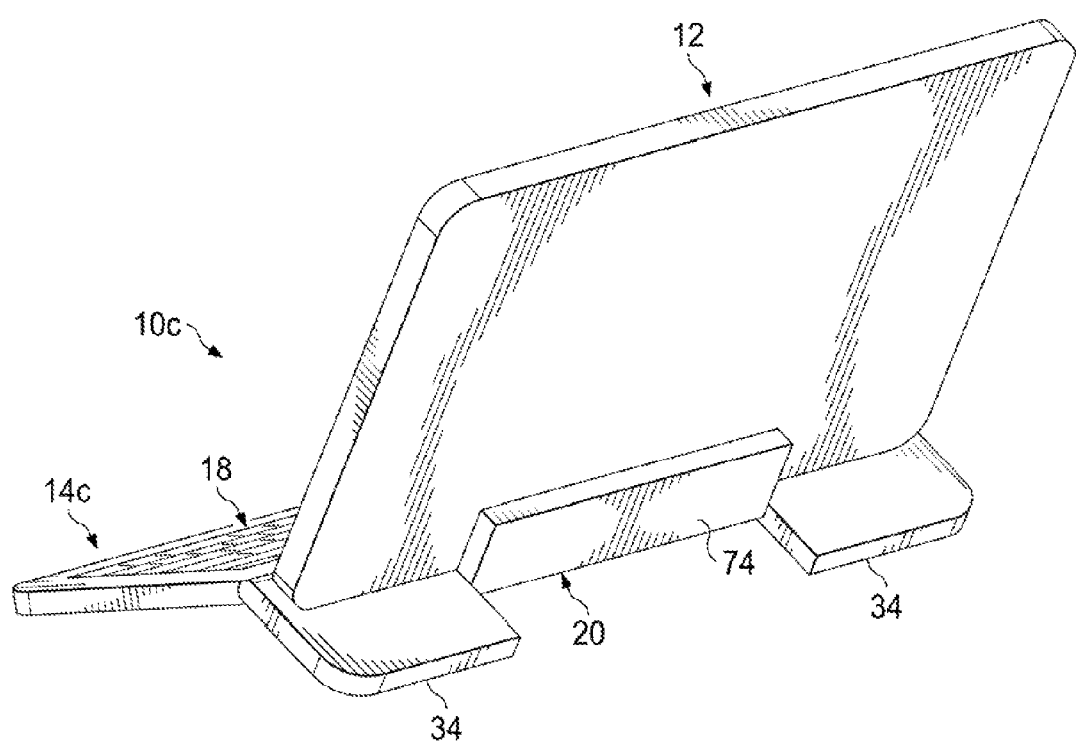
FIG. 7C is a simplified orthographic view illustrating an embodiment of an electronic device, in accordance with one embodiment of the present disclosure.

Turning to FIG. 7C, FIG. 7C is a simplified orthographic view illustrating electronic device 10c in accordance with one embodiment of the present disclosure. When electronic device 10c is in an open tablet configuration, display portion 12 can be connected to keyboard portion 14c through cradle dock 20. Cradle dock 20 provides some support for display portion 12. Side folding supports 34 can be rotated on hinge 46 to help provide additional support for display portion 12.

Figure 8A:
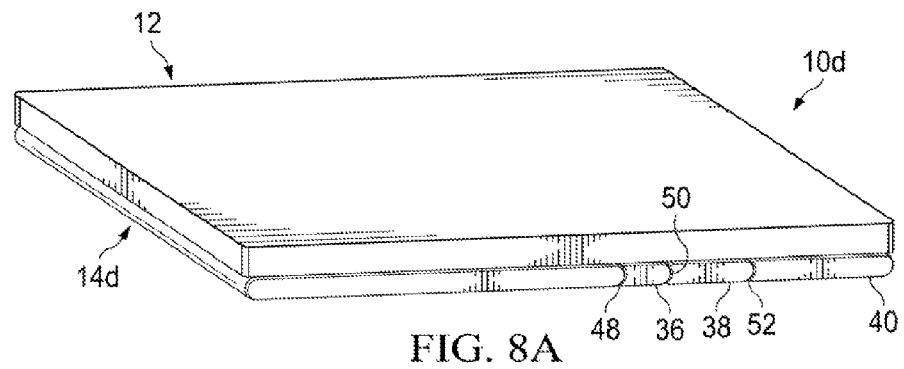
FIG. 8A is a simplified orthographic view illustrating an embodiment of an electronic device, in accordance with one embodiment of the present disclosure.

Turning to FIG. 8A, FIG. 8A is a simplified orthographic view illustrating an electronic device 10d in accordance with one embodiment of the present disclosure. Electronic device 10d includes display portion 12, a keyboard portion 14d, a first rotating support 36, a second rotating support 38, a third rotating support 40, a first hinge 48, a second hinge 50, and a third hinge 52. When electronic device 10d is in a tablet configuration, (as illustrated in FIG. 8A), first rotating support 36, second rotating support 38, and third rotating support 40 are in a closed position and keyboard portion 14d has a relatively flat profile.

Figure 8B:
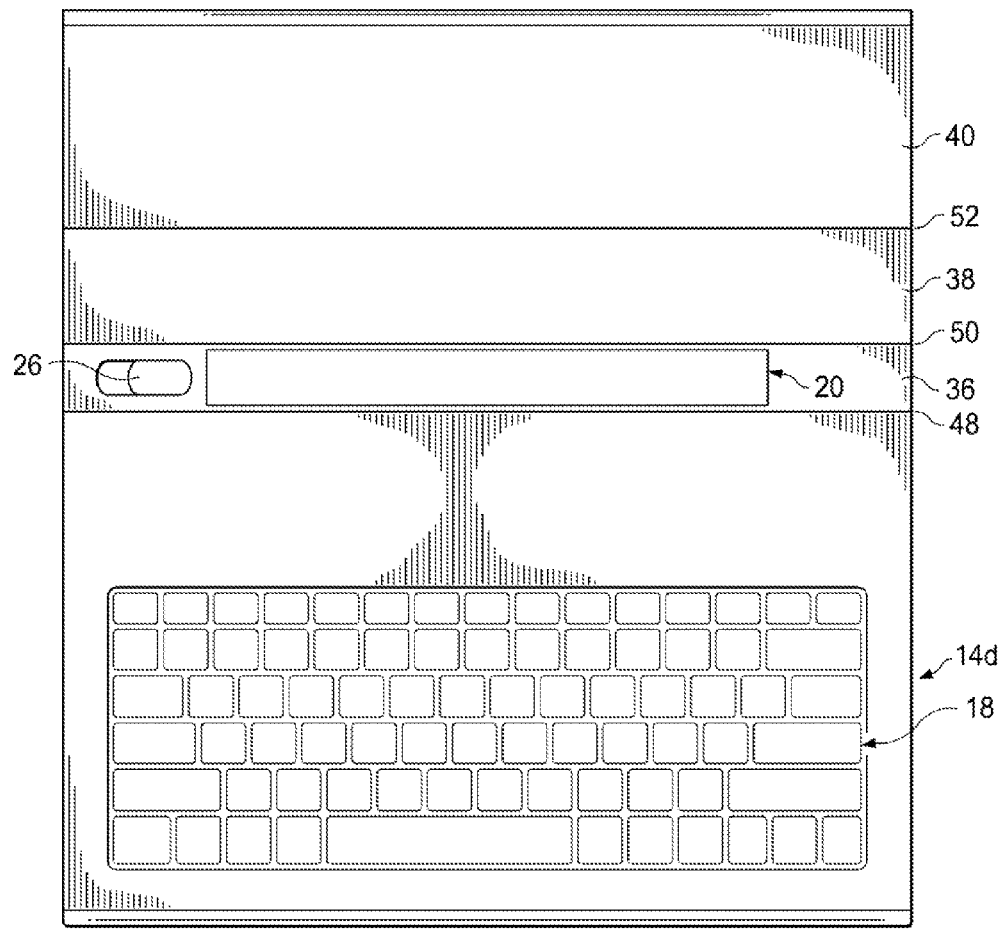
FIG. 8B is a simplified block diagram illustrating an embodiment of an electronic device, in accordance with one embodiment of the present disclosure.

Turning to FIG. 8B, FIG. 8B is a simplified orthographic view illustrating keyboard portion 14d in accordance with one embodiment of the present disclosure. First rotating support may include cradle dock 20 and release mechanism 26. First rotating support can rotate about first hinge 48 and second hinge 50. Second rotating support 38 can rotate about second hinge 50 and third hinge 52. Third rotating support can rotate about third hinge 52.

Figure 8C:
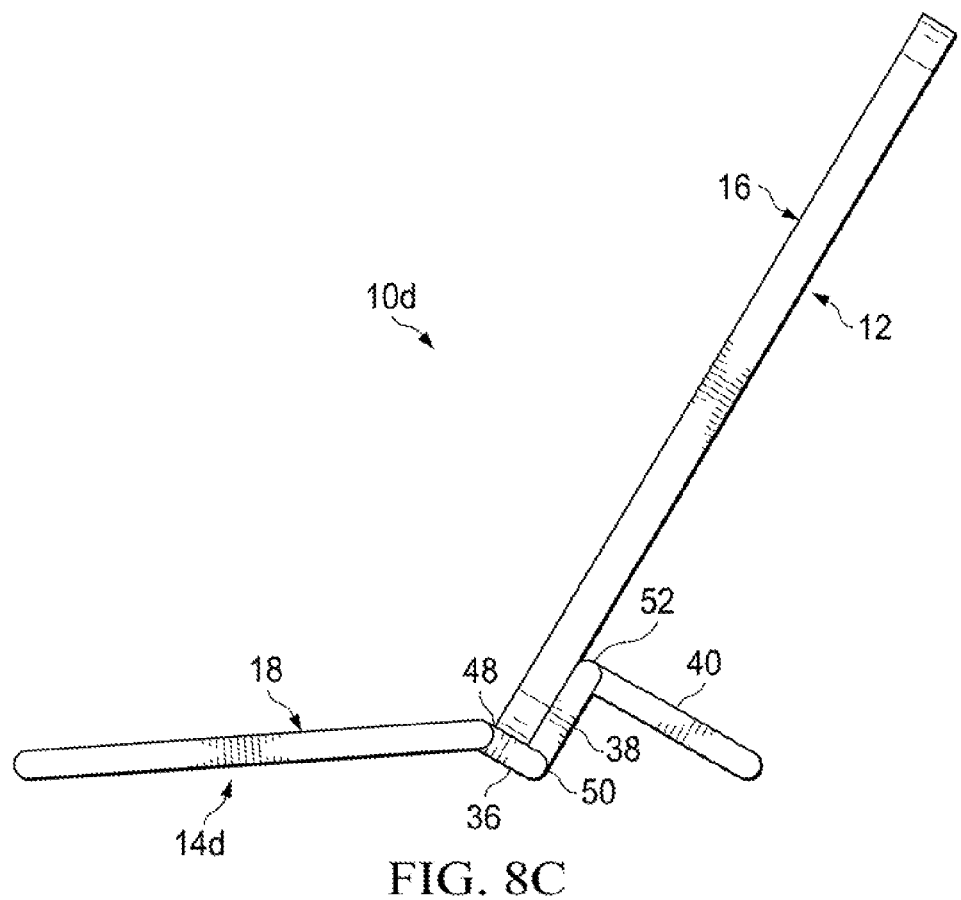
FIG. 8C is a simplified side view illustrating an embodiment of an electronic device, in accordance with one embodiment of the present disclosure.

Turning to FIG. 8C, FIG. 8C is a simplified orthographic view illustrating electronic device 10d in accordance with one embodiment of the present disclosure. When electronic device is in an open tablet configuration display portion 12 can be connected to keyboard portion 14d through cradle dock 20 (not shown) on first rotating support 36. First rotating support 36 provides some support for display portion 12. Second rotating support 38 can be rotated on second hinge 50 to help provide additional support for display portion 12. Third rotating support 40 can be rotated on third hinge 52 to provide support for electronic device 10d where the support is similar to a kickstand support.

Figure 9A:
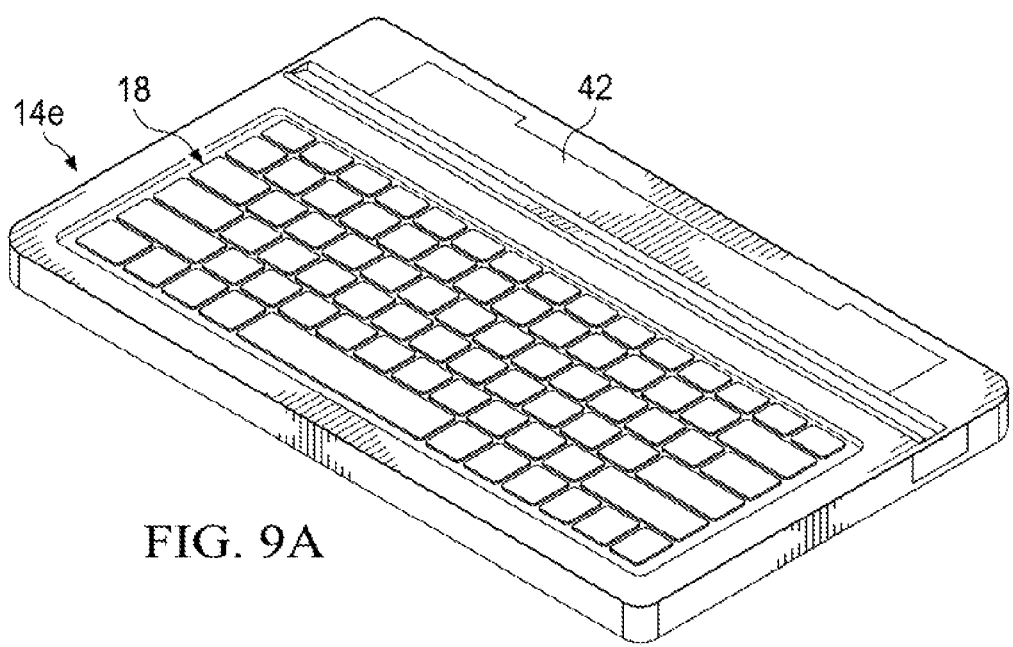
FIG. 9A is a simplified orthographic view illustrating an embodiment of an electronic device, in accordance with one embodiment of the present disclosure.

Turning to FIG. 9A, FIG. 9A is a simplified orthographic view illustrating a keyboard portion 14e in accordance with one embodiment of the present disclosure. Keyboard portion 14e includes keyboard 18 and a kickstand 42. When keyboard portion 14e is in a tablet configuration, closed clamshell configuration, or otherwise not in use, kickstand 42 is in a closed position and keyboard portion 14e has a relatively flat profile.

Turning to FIG. 9B, FIG. 9B is a simplified orthographic view illustrating keyboard portion 14e in accordance with one embodiment of the present disclosure. Keyboard portion 14e includes keyboard 18, kickstand 42, and a roller 44. When kickstand 42 is raised, roller 44 becomes exposed and accessible.

Turning to FIG. 9C, FIG. 9C is a simplified side cut away view illustrating keyboard portion 14e in accordance with one embodiment of the present disclosure. Roller 44 can include interconnect 58. When kickstand 42 is raised, roller 44 and interconnect 58 become accessible to allow attachment of display portion 12 to keyboard portion 14e.

Figure 9D:
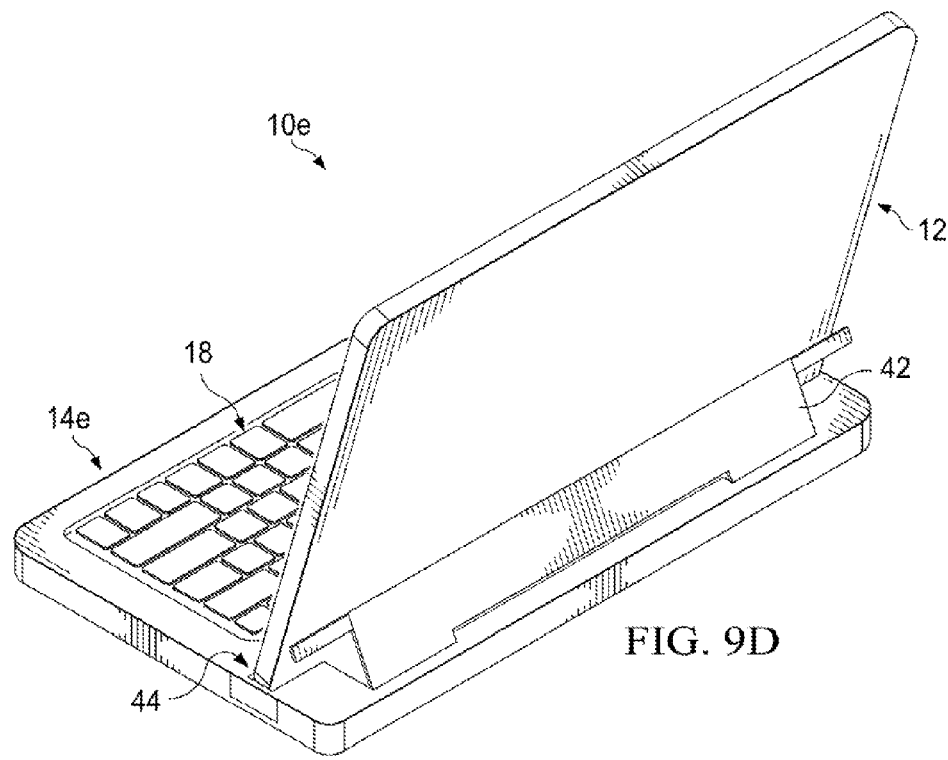
FIG. 9D is a simplified orthographic view illustrating an embodiment of an electronic device, in accordance with one embodiment of the present disclosure.

Turning to FIG. 9D, FIG. 9D is a simplified orthographic view illustrating an electronic device 10e in accordance with one embodiment of the present disclosure. When electronic device 10e is in an open clamshell configuration, display portion 12 can be connected to keyboard portion 14e through interconnect 58 (not shown) in roller 44 and roller 44 helps support display portion 12. Kickstand 42 can also help support display portion 12.

Turning to FIG. 9E, FIG. 9E is a simplified side cut away view illustrating electronic device 10e in accordance with one embodiment of the present disclosure. When electronic device 10e is in an open clamshell configuration, roller 44 and kickstand 42 help support display portion 12. The angle of display portion 12 can be adjusted by rotating kickstand 42. As the angle is adjusted, interconnect 58 (not shown) can rotate in roller 44 to accommodate the adjusted angle of display portion 12.

Figure 10A:
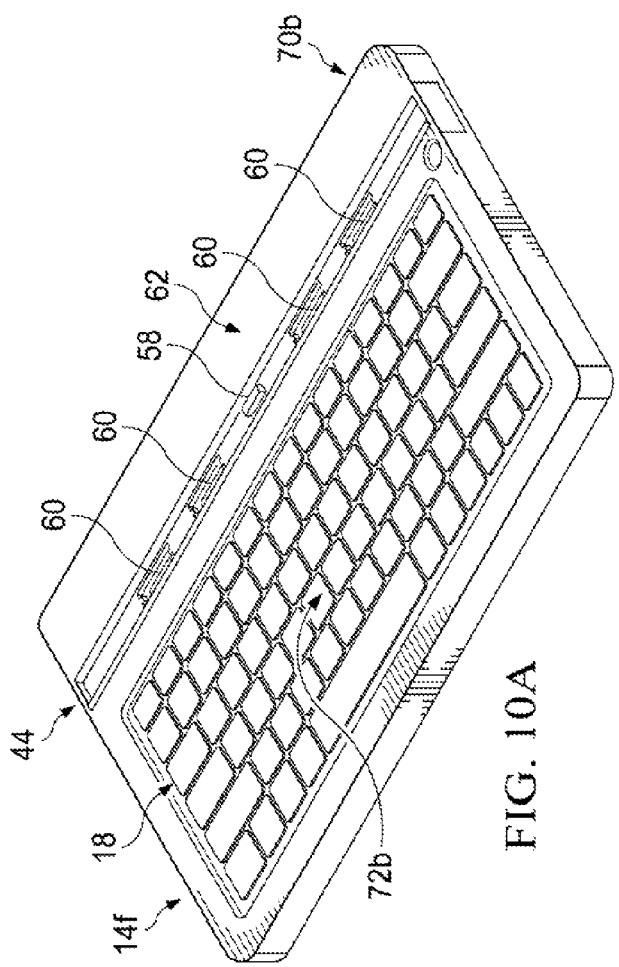
FIG. 10A is a simplified orthographic view illustrating an embodiment of an electronic device, in accordance with one embodiment of the present disclosure.

Turning to FIG. 10A, FIG. 10A is a simplified orthographic view illustrating a keyboard portion 14f in accordance with one embodiment of the present disclosure. Keyboard portion 14f includes keyboard 18, roller 44, interconnect 58, one or more friction elements 60, and a porch area 62. When keyboard portion 14f is connected to display portion 12 and electronic device is in an open clamshell configuration, one or more friction elements 60 can help support display portion 12 and keep display portion 12 at a desired viewing angle. Porch area 62 can allow roller 44 to be closer to a center portion 72b of keyboard portion 14f rather than proximate to an edge 70b of keyboard portion 14f and can aid in preventing display portion 12 and keyboard portion 14f from tipping over as the center of mass is closer to center portion 72b of keyboard portion 14f.

Figure 10B:
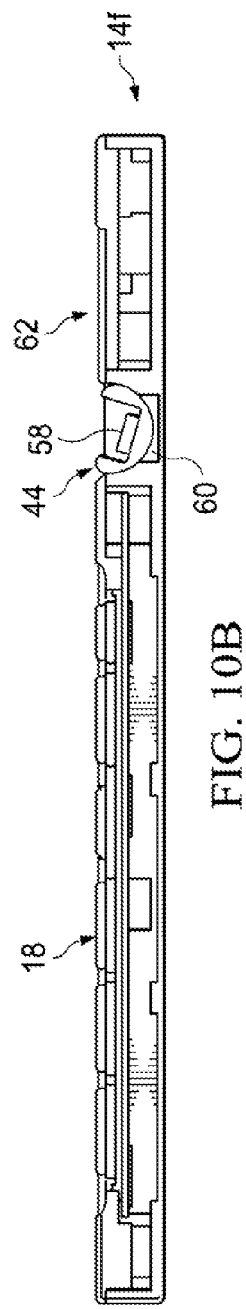
FIG. 10B is a simplified side cutaway view illustrating an embodiment of an electronic device, in accordance with one embodiment of the present disclosure.

Turning to FIG. 10B, FIG. 10B is a simplified orthographic view illustrating keyboard portion 14f in accordance with one embodiment of the present disclosure. Roller 44 can help support display portion 12 when display portion 12 and keyboard portion 14f are in an open clamshell configuration. One or more friction elements 60 can directly apply friction to roller 44 to keep roller 44 and display portion 12 from easily moving. The friction can be applied using a fixed friction surface between one or more friction elements 60 and roller 44, a spring that applies load to a sliding friction pad that is set against roller 44 (similar to an automotive drum brake), or some other method.

Turning to FIG. 11A, FIG. 11A is a simplified orthographic view illustrating a keyboard portion 14g in accordance with one embodiment of the present disclosure. Keyboard portion 14g includes keyboard 18, roller 44, interconnect 58, porch 62, a gear lock 64, and a gear lock release 66. When keyboard portion 14g is connected to display portion 12 in an open clamshell configuration, gear lock 64 can help support display portion 12 and keep display portion 12 at a desired viewing angle. Porch area 62 can allow roller 44 to be closer to a center portion 72c of keyboard portion 14g rather than proximate to an edge 70c of keyboard portion 14g and can aid in preventing display portion 12 and keyboard portion 14g from tipping over as the center of mass is closer to center portion 72c of keyboard portion 14g.

Turning to FIG. 11B, FIG. 11B is a simplified orthographic view illustrating keyboard portion 14g in accordance with one embodiment of the present disclosure. Roller 44 can help support display portion 12 when display portion 12 and keyboard portion 14g are in an open clamshell configuration. Gear lock 64 can lock or otherwise secure or inhibit movement of roller 44 to keep roller 44 and display portion 12 from easily moving. The movement can be inhibited using mechanical gears or some other method. Gear lock release 66 can disengage gear lock 64 to allow for relatively easy movement of roller 44 and display portion 12. Once display portion 12 is at a desired viewing angle, gear lock 64 can be reengaged to secure roller 44 and display portion 12.

Note that the embodiments of FIGS. 2-11b are simply reflective of one of the many possible design choices for electronic devices 10a-e. In other cases, the shape and the size of cradle dock 20 may be varied considerably. For example, in certain cases, the length of cradle dock 20 may occupy only a portion of the keyboard framework. Consider a case in which a design of cradle dock 20 only inhibits a top center portion of the keyboard framework. In other cases, a design could be provided where cradle dock 20 inhibits a majority of the top portion of the keyboard framework.

Figure 12:
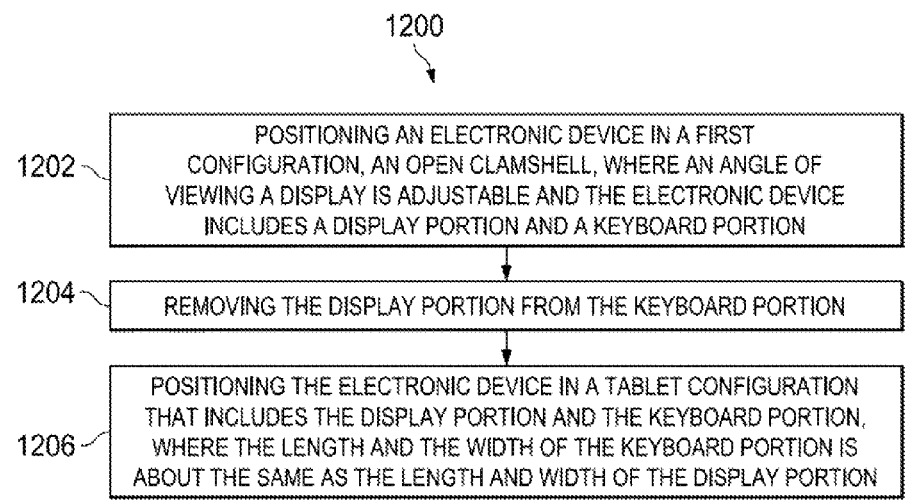
FIG. 12 illustrates, for at least one embodiment, a flow diagram in accordance with at least one embodiment of the present disclosure.

FIG. 12 is a simplified flowchart 1200 illustrating example activities of a keyboard protection mechanism in accordance with at least one example embodiment of the present disclosure. 1202 can include positioning an electronic device in an open clamshell configuration where an angle of viewing a display is adjustable and the electronic device includes a display portion and a keyboard portion. 1204 can include removing the display portion from the keyboard portion. 1206 can include positioning the electronic device in a tablet configuration that includes the display portion and the keyboard portion, where the length and the width of the keyboard portion is about the same as the length and width of the display portion.

Figure 13:
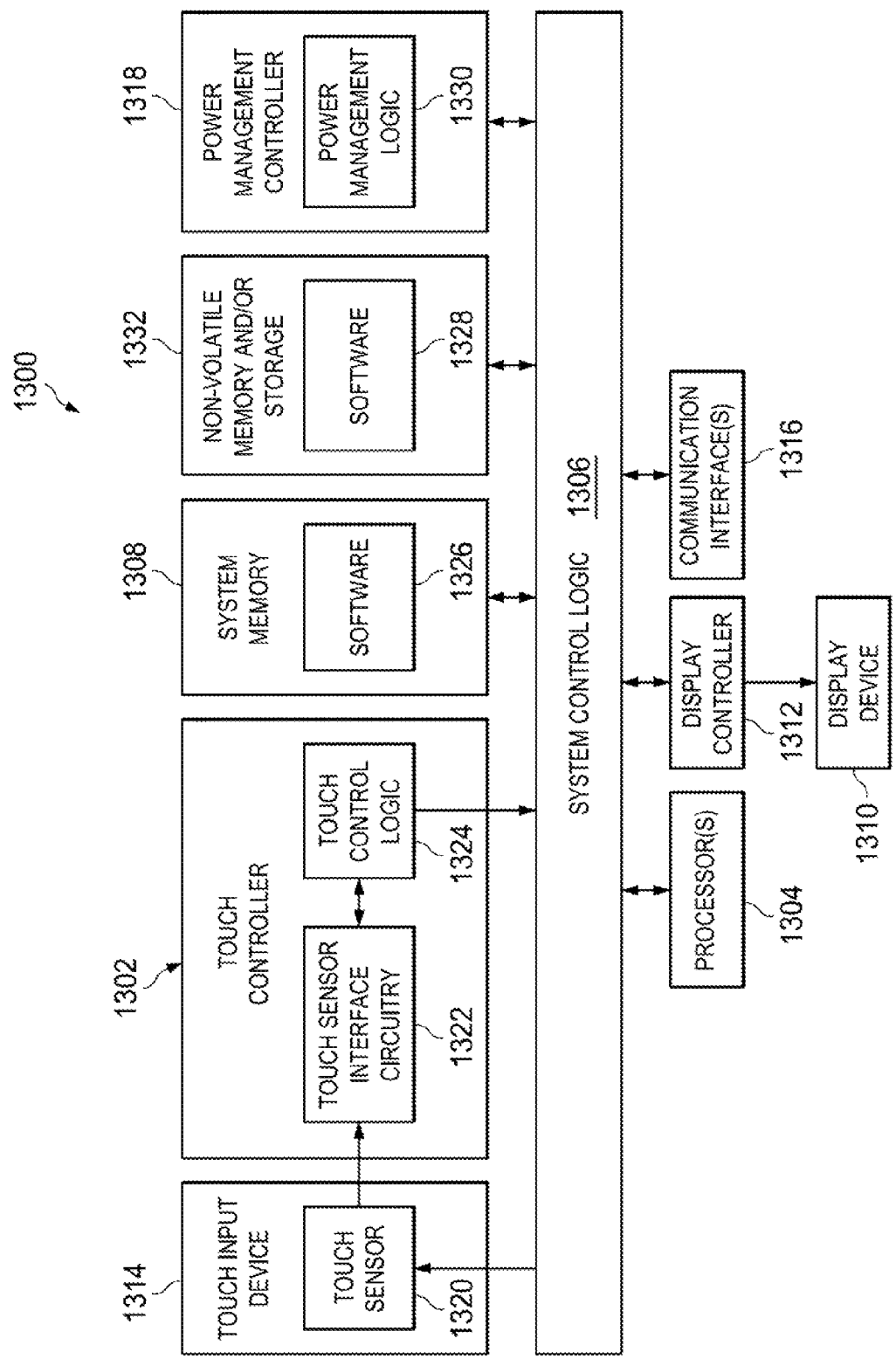
FIG. 13 is a simplified block diagram illustrating potential electronics and logic that may be associated with one embodiment of the electronic device.

FIG. 13 is a simplified block diagram illustrating potential electronics and logic that may be associated with electronic devices 10*a*-10*e* discussed herein. In at least one example embodiment, system 1300 can include a touch controller 1302, one or more processors 1304, system control logic 1306 coupled to at least one of processor(s) 1304, system memory 1308 coupled to system control logic 1306, non-volatile memory and/or storage device(s) 1332 coupled to system control logic 1306, display controller 1312 coupled to system control logic 1306, display controller 1312 coupled to a display device 1310, power management controller 1318 coupled to system control logic 1306, and/or communication interfaces 1316 coupled to system control logic 1306.

Hence, the basic building blocks of any computer system (e.g., processor, memory, I/O, display, etc.) can be used in conjunction with the teachings of the present disclosure. Certain components could be discrete or integrated into a System on Chip (SoC). Some general system implementations can include certain types of form factors in which system 1300 is part of a more generalized enclosure. In alternate implementations, instead of notebook device/laptops, etc., certain alternate embodiments deal with mobile phones, tablet devices, etc.

System control logic 1306, in at least one embodiment, can include any suitable interface controllers to provide for any suitable interface to at least one processor 1304 and/or to any suitable device or component in communication with system control logic 1306. System control logic 1306, in at least one embodiment, can include one or more memory controllers to provide an interface to system memory 1308. System memory 1308 may be used to load and store data and/or instructions, for example, for system 1300. System memory 1308, in at least one embodiment, can include any suitable volatile memory, such as suitable dynamic random access memory (DRAM) for example. System control logic 1306, in at least one embodiment, can include one or more I/O controllers to provide an interface to display device 1310, touch controller 1302, and non-volatile memory and/or storage device(s) 1332.

Non-volatile memory and/or storage device(s) 1332 may be used to store data and/or instructions, for example within software 1328. Non-volatile memory and/or storage device(s) 1332 may include any suitable non-volatile memory, such as flash memory for example, and/or may include any suitable non-volatile storage device(s), such as one or more hard disc drives (HDDs), one or more compact disc (CD) drives, and/or one or more digital versatile disc (DVD) drives for example.

Power management controller 1318 may include power management logic 1330 configured to control various power management and/or power saving functions. In at least one example embodiment, power management controller 1318 is configured to reduce the power consumption of components or devices of system 1300 that may either be operated at reduced power or turned off when the electronic device is in a closed configuration. For example, in at least one embodiment, when the electronic device is in a closed configuration, power management controller 1318 performs one or more of the following: power down the unused portion of the display and/or any backlight associated therewith; allow one or more of processor(s) 1304 to go to a lower power state if less computing power is required in the closed configuration; and shutdown any devices and/or components that are unused when an electronic device is in the closed configuration.

Communications interface(s) 1316 may provide an interface for system 1300 to communicate over one or more networks and/or with any other suitable device. Communications interface(s) 1316 may include any suitable hardware and/or firmware. Communications interface(s) 1316, in at least one example embodiment, may include, for example, a network adapter, a wireless network adapter, a telephone modem, and/or a wireless modem. System control logic 1306, in at least one embodiment, can include one or more I/O controllers to provide an interface to any suitable input/output device(s) such as, for example, an audio device to help convert sound into corresponding digital signals and/or to help convert digital signals into corresponding sound, a camera, a camcorder, a printer, and/or a scanner.

For at least one embodiment, at least one processor 1304 may be packaged together with logic for one or more controllers of system control logic 1306. In at least one embodiment, at least one processor 1304 may be packaged together with logic for one or more controllers of system control logic 1306 to form a System in Package (SiP). In at least one embodiment, at least one processor 1304 may be integrated on the same die with logic for one or more controllers of system control logic 1306. For at least one embodiment, at least one processor 1304 may be integrated on the same die with logic for one or more controllers of system control logic 1306 to form a System on Chip (SoC).

For touch control, touch controller 1302 may include touch sensor interface circuitry 1322 and touch control logic 1324. Touch sensor interface circuitry 1322 may be coupled to detect touch input over a first touch surface layer and a second touch surface layer of a display (i.e., display device 1310). Touch sensor interface circuitry 1322 may include any suitable circuitry that may depend, for example, at least in part on the touch-sensitive technology used for a touch input device. Touch sensor interface circuitry 1322, in one embodiment, may support any suitable multi-touch technology. Touch sensor interface circuitry 1322, in at least one embodiment, can include any suitable circuitry to convert analog signals corresponding to a first touch surface layer and a second surface layer into any suitable digital touch input data. Suitable digital touch input data for at least one embodiment may include, for example, touch location or coordinate data.

Touch control logic 1324 may be coupled to help control touch sensor interface circuitry 1322 in any suitable manner to detect touch input over a first touch surface layer and a second touch surface layer. Touch control logic 1324 for at least one example embodiment may also be coupled to output in any suitable manner digital touch input data corresponding to touch input detected by touch sensor interface circuitry 1322. Touch control logic 1324 may be implemented using any suitable logic, including any suitable hardware, firmware, and/or software logic (e.g., non-transitory tangible media), that may depend, for example, at least in part on the circuitry used for touch sensor interface circuitry 1322. Touch control logic 1324 for at least one embodiment may support any suitable multi-touch technology.

Touch control logic 1324 may be coupled to output digital touch input data to system control logic 1306 and/or at least one processor 1304 for processing. At least one processor 1304 for at least one embodiment may execute any suitable software to process digital touch input data output from touch control logic 1324. Suitable software may include, for example, any suitable driver software and/or any suitable application software. As illustrated in FIG. 13, system memory 1308 may store suitable software 1326 and/or non-volatile memory and/or storage device(s).

Note that with the examples provided above, as well as numerous other examples provided herein, interaction may be described in terms of layers, protocols, interfaces, spaces, and environments more generally. However, this has been done for purposes of clarity and example only. In certain cases, it may be easier to describe one or more of the functionalities of a given set of flows by only referencing a limited number of components. It should be appreciated that the architectures discussed herein (and its teachings) are readily scalable and can accommodate a large number of components, as well as more complicated/sophisticated arrangements and configurations. Accordingly, the examples provided should not limit the scope or inhibit the broad teachings of the present disclosure, as potentially applied to a myriad of other architectures.

It is also important to note that a number of operations have been described as being executed concurrently with, or in parallel to, one or more additional operations. However, the timing of these operations may be altered considerably. The preceding examples and operational flows have been offered for purposes of example and discussion. Substantial flexibility is provided by the present disclosure in that any suitable arrangements, chronologies, configurations, and timing mechanisms may be provided without departing from the teachings provided herein.

It is also imperative to note that all of the Specifications, and relationships outlined herein (e.g., specific commands, timing intervals, supporting ancillary components, etc.) have only been offered for purposes of example and teaching only. Each of these may be varied considerably without departing from the spirit of the present disclosure, or the scope of the appended claims. The specifications apply to many varying and non-limiting examples and, accordingly, they should be construed as such. In the foregoing description, examples have been described. Various modifications and changes may be made to such examples without departing from the scope of the appended claims. The description and drawings are, accordingly, to be regarded in an illustrative rather than a restrictive sense.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

Example Embodiment Implementations

One particular example implementation of an electronic device may include activities associated with transitioning a cradle dock from a first configuration to a second configuration. The cradle dock allows a display portion to be removably connected to a keyboard portion and a viewing angle of the display portion can be adjusted while the cradle dock is in the first configuration. The cradle dock has a substantially flat profile with the keyboard portion in the second configuration and the keyboard portion has about the same length and about the same width as the display portion. A stacking connector may join the keyboard portion to the display portion in the second configuration. In another example, activating a release mechanism can transition the cradle dock from the second configuration back to the first configuration. The first configuration can be a clamshell configuration and the second configuration can be a tablet configuration. In the first configuration, the cradle dock may include a back plate to support the display in the first configuration. The display portion can include a touch display.

In another example implementation, a system is provided that includes means for transitioning a cradle dock from a first configuration to a second configuration, where the cradle dock allows a display portion to be removably connected to a keyboard portion and a viewing angle of the display portion can be adjusted while the cradle dock is in the first configuration. The cradle dock has a substantially flat profile with the keyboard portion in the second configuration and the keyboard portion has about the same length and about the same width as the display portion.

Other Notes and Examples

Example A1 is an electronic device that includes a keyboard that includes a display portion (e.g., having a length and a width and a keyboard portion having about the same length and about the same width as the display portion). The keyboard portion includes a cradle dock to allow the display portion to be removably connected to the keyboard portion in a first configuration, where a viewing angle of the display portion can be adjusted.

In Example A2, the subject matter of Example A1 may optionally include a stacking connector that can join the keyboard portion to the display portion in a second configuration. In Example A3, the subject matter of any of the preceding 'A' Examples can optionally include where the cradle dock has a substantially flat profile when the electronic device is in the second configuration.

In Example A4, the subject matter of any of the preceding 'A' Examples can optionally include where the first configuration is a clamshell configuration and the second configuration is a tablet configuration.

In Example A5, the subject matter of any of the preceding 'A' Examples can optionally include a release mechanism to transition the cradle dock from a substantially flat profile into a position where the display portion can be removably connected to the keyboard portion.

In Example A6, the subject matter of any of the preceding 'A' Examples can optionally include where in the first configuration, the cradle dock includes a back plate to support the display portion.

In Example A7, the subject matter of any of the preceding 'A' Examples can optionally include where a footprint of the display portion is about the same as the keyboard portion.

In Example A8, the subject matter of any of the preceding 'A' Examples can optionally include a touch display.

Example AA1 can include an electronic device that includes a display portion; a keyboard portion; and a cradle dock to allow the electronic device to be transitioned from a first configuration to a second configuration, where the cradle dock is provided proximate to a back edge of the keyboard portion, and where the cradle dock allows the display portion to be removably connected to the keyboard portion in a first configuration.

In Example AA2, the subject matter of any of the preceding 'AA' Examples can optionally have the cradle dock including one or more pin inserts and a back plate to support the display portion while allowing for a viewing angle adjustment. In Example AA3, the subject matter of any of the preceding 'AA' Examples can optionally have the second configuration being a tablet configuration. In Example AA4, the subject matter of any of the preceding 'AA' Examples can optionally have the cradle dock including a back plate to support the display portion. In Example AA5, the subject matter of any of the preceding 'AA' Examples can optionally operate such that when the display portion is undocked, the cradle dock is substantially receded into the keyboard portion. In Example AA6, the subject matter of any of the preceding 'AA' Examples can optionally have a release mechanism to transition the cradle dock from a substantially flat profile into a position where the display portion can be removable connected to the keyboard portion, and where when the display portion is lifted from the keyboard portion, the cradle dock can be raised through a button.

Example M1 is a method that includes transitioning a cradle dock from a first configuration to a second configuration, where the cradle dock allows a display portion to be removably connected to a keyboard portion and a viewing angle of the display portion can be adjusted while the cradle dock is in the first configuration. The cradle dock has a substantially flat profile with the keyboard portion in the second configuration and the keyboard portion has about the same length and about the same width as the display portion.

In Example M2, the subject matter of any of the preceding 'M' Examples can optionally include where in the second configuration, a stacking connector can join the keyboard portion to the display portion.

In Example M3, the subject matter of any of the preceding 'M' Examples can optionally include activating a release mechanism to transition the cradle dock from the second configuration back to the first configuration.

In Example M4, the subject matter of any of the preceding 'M' Examples can optionally include where the first configuration is a clamshell configuration and the second configuration is a tablet configuration.

In Example M5, the subject matter of any of the preceding 'M' Examples can optionally include where in the first configuration, the cradle dock includes a back plate to support the display in an open clamshell configuration.

In Example M6, the subject matter of any of the preceding 'M' Examples can optionally include where the display portion includes a touch display.

An example system S1 can include means for receiving a display portion and a means for transitioning a cradle dock from a first configuration to a second configuration, where the cradle dock allows the display portion to be removably connected to a keyboard portion and a viewing angle of the display portion can be adjusted while the cradle dock is in the first configuration. The cradle dock has a substantially flat profile with the keyboard portion in the second configuration and the keyboard portion has about the same length and about the same width as the display portion.

Example X1 is a machine-readable storage medium including machine-readable instructions to implement a method or realize an apparatus as in any one of the Examples A1-A8, AA1-AA6, M1-M6. Example Y1 is an apparatus comprising means for performing of any of the Example methods M1-M6. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. An electronic device, comprising:
a display portion; and
a keyboard portion that includes a cradle dock to allow the display portion to be removably connected to the keyboard portion in a first configuration, wherein a viewing angle of the display portion can be adjusted, wherein the cradle dock is relatively flush with a surface of the keyboard portion when the cradle dock is not in use and extends from the surface of the keyboard portion when the cradle dock is in use.

2. The electronic device of claim 1, further comprising a stacking connector, wherein the stacking connector can join the keyboard portion to the display portion in a second configuration, wherein the stacking connector allows the display portion to be stacked on, and held to, the keyboard portion in a display up orientation or a display down orientation.

3. The electronic device of claim 1, wherein the first configuration is a clamshell configuration and the second configuration is a tablet configuration.

4. The electronic device of claim 1, further comprising a release mechanism to transition the cradle dock from a substantially flat profile into a position where the display portion can be removably connected to the keyboard portion.

5. The electronic device of claim 2, further comprising:
one or more surface connectors that are charged by batteries in the keyboard portion.

6. The electronic device of claim 1, wherein in the first configuration, the cradle dock includes a back plate to support the display portion.

7. The electronic device of claim 1, further comprising a touch display.

8. The electronic device of claim 1, wherein the keyboard portion includes an interconnect, wherein the interconnect allows for communication between the display portion and the keyboard portion when the display portion is connected to the keyboard potion.

9. An electronic device, comprising:
a display portion;
a keyboard portion; and
a cradle dock to allow the electronic device to be transitioned from a first configuration to a second configuration, wherein the cradle dock is provided proximate to a back edge of the keyboard portion, and wherein the cradle dock allows the display portion to be removably connected to the keyboard portion in a first configuration, wherein the cradle dock is relatively flush with a surface of the keyboard portion when the cradle dock is not in use and extends from the surface of the keyboard portion when the cradle dock is in use.

10. The electronic device of claim 9, wherein the cradle dock comprises one or more pin inserts and a back plate to support the display portion while allowing for a viewing angle adjustment.

11. The electronic device of claim 9, wherein the second configuration is a tablet configuration.

12. The electronic device of claim 9, wherein in the first configuration, the cradle dock includes a back plate to support the display portion.

13. The electronic device of claim 9, wherein when the display portion is undocked, the cradle dock is substantially receded into the keyboard portion.

14. The electronic device of claim 13, further comprising a release mechanism to transition the cradle dock from a substantially flat profile into a position where the display portion can be removable connected to the keyboard portion, and wherein when the display portion is lifted from the keyboard portion, the cradle dock can be raised through a button.

15. A method, comprising:
receiving a display portion; and
transitioning a cradle dock from a first configuration to a second configuration, wherein the cradle dock allows the display portion to be removably connected to a keyboard portion and a viewing angle of the display portion can be adjusted while the cradle dock is in the first configuration, wherein the cradle extends from the surface of the keyboard portion when in the first configuration, wherein the cradle dock has a substantially flat profile and is relatively flush with a surface of the keyboard portion in the second configuration, wherein the keyboard portion has about the same length and about the same width as the display portion.

16. The method of claim 15, wherein in the second configuration, a stacking connector can join the keyboard portion to the display portion.

17. The method of claim 15, further comprising activating a release mechanism to transition the cradle dock from the second configuration back to the first configuration.

18. The method of claim 15, wherein the first configuration is a clamshell configuration and the second configuration is a tablet configuration.

19. The method of claim 18, wherein in the first configuration, the cradle dock includes a back plate to support the display in an open clamshell configuration.

20. A system, comprising:
means for receiving a display portion; and
means for transitioning a cradle dock from a first configuration to a second configuration, wherein the cradle dock allows the display portion to be removably connected to a keyboard portion and a viewing angle of the display portion can be adjusted while the cradle dock is in the first configuration, wherein the cradle extends from the surface of the keyboard portion when in the first configuration, wherein the cradle dock has a substantially flat profile and is relatively flush with a surface of the keyboard portion in the second configuration, wherein the keyboard portion has about the same length and about the same width as the display portion.

* * * * *